United States Patent
Oosting

(10) Patent No.: US 8,389,918 B2
(45) Date of Patent: *Mar. 5, 2013

(54) ACTUATED FEEDFORWARD CONTROLLED SOLAR TRACKING SYSTEM

(75) Inventor: Kenneth Oosting, Rocklin, CA (US)

(73) Assignee: Inspired Surgical Technologies, Inc., Roseville, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 12/692,328

(22) Filed: Jan. 22, 2010

(65) Prior Publication Data

US 2010/0180883 A1    Jul. 22, 2010

Related U.S. Application Data

(60) Provisional application No. 61/146,508, filed on Jan. 22, 2009, provisional application No. 61/171,263, filed on Apr. 21, 2009, provisional application No. 61/234,476, filed on Aug. 17, 2009, provisional application No. 61/254,963, filed on Oct. 26, 2009.

(51) Int. Cl.
*G01C 21/02* (2006.01)
*H01J 40/14* (2006.01)
*G06M 7/00* (2006.01)

(52) U.S. Cl. .................. 250/203.4; 250/214 R; 250/221

(58) Field of Classification Search .... 250/203.1–203.4, 250/221, 239, 559.29, 206.1, 206.2; 126/569, 126/572–574, 576–578, 600, 601, 604, 605; 356/139.01; 136/243, 244, 252

See application file for complete search history.

(56) References Cited

U.S. PATENT DOCUMENTS

| 4,063,543 | A | 12/1977 | Hedger |
| 4,283,588 | A | 8/1981 | Zitzelsberger |
| 4,332,240 | A | 6/1982 | Ward |
| 4,440,150 | A | 4/1984 | Kaehler |
| 4,628,142 | A | 12/1986 | Hashizume |
| 4,798,949 | A | 1/1989 | Wilcox et al. |
| 5,227,618 | A | 7/1993 | Shingleton |
| 5,317,145 | A | 5/1994 | Corio |
| 5,374,317 | A | 12/1994 | Lamb et al. |
| 5,980,052 | A | 11/1999 | Thor et al. |
| 6,123,067 | A | 9/2000 | Warrick |
| 6,208,296 | B1 | 3/2001 | Saib |
| 6,363,928 | B1 | 4/2002 | Anderson, Jr. |
| 6,563,040 | B2 | 5/2003 | Hayden et al. |
| 6,612,041 | B1 | 9/2003 | Hillis |

(Continued)

FOREIGN PATENT DOCUMENTS

| EP | 1995790 A2 | 11/2008 |
| WO | WO 2008/084121 | 7/2008 |

OTHER PUBLICATIONS

International Searching Authority, Korean Intellectual Property Office, PCT International Search Report for PCT/US2010/021708.

*Primary Examiner* — Pascal M Bui Pho
(74) *Attorney, Agent, or Firm* — DLA Piper LLP (US)

(57) ABSTRACT

An actuated feedforward controlled solar tracker system including a sub-frame supporting at least one solar panel, a post supporting the sub-frame, and a linking mechanism connecting the sub-frame and post, where the linking mechanism includes a first axle, second axle and body member. The linking mechanism's first and second axles are disposed orthogonal to each other and are separated by the body member. The system includes at least two linear actuators, a rotational joint connecting the linear actuators and sub-frame, and a driver system that drives the actuators. Additionally, the system includes a feedforward control system including a computer that calculates desired positions of the linear actuators using multiple inputs and communicates with the driver system to drive the linear actuators, and a feedback control system that relays information gathered by sensor devices to the feedforward control system, where the feedforward and feedback control systems function in an integrated manner.

21 Claims, 20 Drawing Sheets

U.S. PATENT DOCUMENTS

| | | |
|---|---|---|
| 6,662,801 B2 | 12/2003 | Hayden et al. |
| 6,680,693 B2 | 1/2004 | Urban et al. |
| 6,704,607 B2 | 3/2004 | Stone et al. |
| 6,960,717 B2 | 11/2005 | Stuart et al. |
| 2,488,131 A1 | 10/2008 | Hines et al. |
| 7,607,427 B2 | 10/2009 | Yi et al. |
| 2006/0201498 A1 | 9/2006 | Olsson et al. |
| 2008/0011288 A1* | 1/2008 | Olsson .......................... 126/576 |
| 2009/0032086 A1 | 2/2009 | Kats et al. |
| 2009/0050191 A1 | 2/2009 | Young et al. |
| 2009/0065045 A1 | 3/2009 | Tsadka et al. |
| 2009/0114211 A1 | 5/2009 | Homyk et al. |
| 2009/0179139 A1 | 7/2009 | Hines et al. |
| 2009/0266354 A1 | 10/2009 | Chen |
| 2010/0095955 A1 | 4/2010 | Carrasco Martinez |
| 2010/0180884 A1* | 7/2010 | Oosting ....................... 126/574 |

* cited by examiner

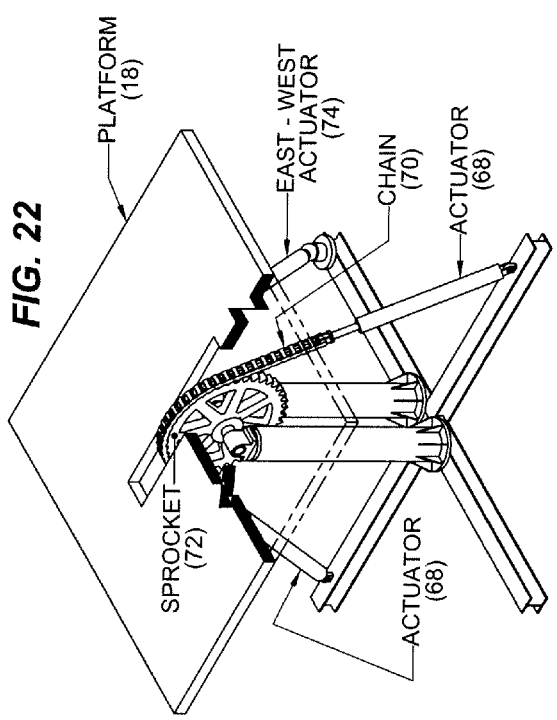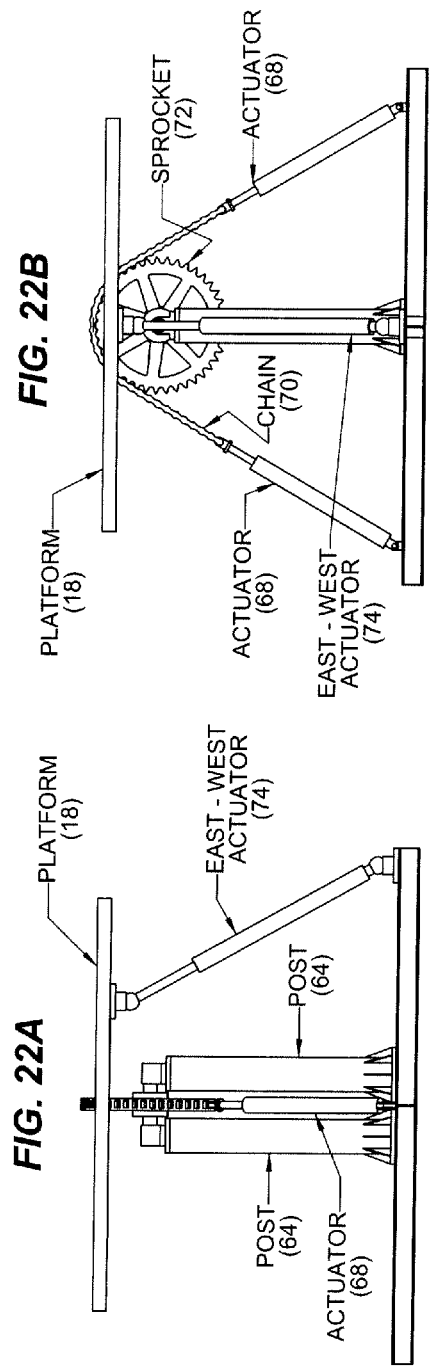

ACTUATED FEEDFORWARD CONTROLLED SOLAR TRACKING SYSTEM

CROSS-REFERENCE TO RELATED APPLICATIONS

This application claims priority to provisional application Nos. 61/146,508, which was filed in the U.S. Patent and Trademark Office ("USPTO") on Jan. 22, 2009; 61/171,263, which was filed in the USPTO on Apr. 21, 2009; 61/234,476, which was filed on Aug. 17, 2009; and 61/254,963, which was filed in the USPTO on Oct. 26, 2009.

STATEMENT REGARDING FEDERALLY SPONSORED RESEARCH OR DEVELOPMENT

This application is not the subject of any federally sponsored research or development.

THE NAMES OF THE PARTIES TO A JOINT RESEARCH AGREEMENT

There has been no joint research agreements entered into with any third-parties.

BACKGROUND OF THE EMBODIMENTS OF THE PRESENT INVENTION

Solar generation systems and devices for tracking the sun across the sky are known in the art. A number of existing systems use simple control methodologies to enable solar panels to track the sun periodically during daylight hours. The systems described in this application improve upon existing solar tracker systems by, among other things, using a complex feedforward control system for smooth and continuous tracking of the sun across the sky and utilizing a mechanical apparatus that reduces costs and improves reliability, durability and accuracy of the solar trackers.

BRIEF SUMMARY OF THE EMBODIMENTS OF THE PRESENT INVENTION

An embodiment of the present invention is directed to an actuated feedforward controlled solar tracker system that includes a sub-frame capable of supporting at least one solar panel, at least one post for supporting the sub-frame, and a linking mechanism that connects the sub-frame to the post, where the linking mechanism includes a first axle, a second axle and a body member that connects the first axle to the second axle. Further, the first axle and the second axle of the linking mechanism are disposed substantially orthogonal to each other and are separated by a distance equal to the body member. The system also includes at least two linear actuators, each containing a first end and second end, a rotational joint that connects the second end of the linear actuators to the sub-frame, and a driver system that drives the linear actuators. Additionally, the system includes a feedforward control system that includes a computer that calculates desired positions of the linear actuators using multiple data points as inputs and communicates with the driver system to drive the linear actuators to these desired positions, and a feedback control system that relays information gathered by sensor devices to the feedforward control system, where the feedforward control system and the feedback control system function in an integrated manner.

Another embodiment of the present invention is directed to an actuated feedforward controlled solar tracker system that includes a sub-frame capable of supporting at least one solar panel, at least one post for supporting the sub-frame, and a linking mechanism that connects the sub-frame to the post, where the linking mechanism includes a first axle, a second axle and a body member that connects the first axle to the second axle. Further, the first axle and the second axle are disposed substantially orthogonal to each other and are separated by a distance equal to the length of the body member, and the first axle, the second axle and the body member are an integrated member. The system also includes at least two linear actuators, each actuator containing a first end and second end, a rotational joint for connecting the second end of the linear actuators to the sub-frame, a driver system including a hydraulic system for driving the linear actuators, and at least one pedestal that has a first end and second end, where the first end is connected to a beam of a foundation system and the second end is connected to a linear actuator. Additionally, the system includes a feedforward control system that includes a computer that calculates desired positions of the linear actuators using multiple data points as inputs and communicates with the driver system to drive the linear actuators to these desired positions, where the data points include time of day, time of year, date, geographical positioning system coordinates, onboard clock, foundation orientation, cylinder positions, the linking member's angles, valve positions and solar tracking sensor data, and the computer in the system uses polynomial spline curves. The system further includes a feedback control system that relays information gathered by sensor devices to the feedforward control system, and the feedforward control system and the feedback control system function in an integrated manner.

Yet another embodiment of the present invention is directed to an actuated feedforward controlled solar tracker system that includes a sub-frame capable of supporting at least one solar panel, at least one post for supporting the sub-frame; and a linking mechanism that connects the sub-frame to the post, wherein the linking mechanism includes a first axle, a second axle and a body member connecting the first axle to the second axle. Further, the first axle and second axle are disposed substantially orthogonal to each other and are separated by a distance equal to the length of the body member, where the first axle, the second axle and the body member are an integrated member, and where the ends of the first axle and the second axle are disposed in bearing assemblies. The system also includes at least two linear actuators, each actuator having a first end and second end, in which a rotational joint is used for connecting the second end of the linear actuators to the sub-frame. Additionally the system includes a driver system including a hydraulic system for driving the linear actuators. The system also includes at least one pedestal having a first end and second end, where the first end is connected to a beam of a foundation system and the second end is connected to a linear actuator. Additionally, the system includes a means for preventing the sub-frame from being driven past its mechanical limits. The system also includes a feedforward control system that includes a computer that calculates desired positions of the linear actuators using multiple data points as inputs and communicates with the driver system to drive the linear actuators to these desired positions, where the data points include time of day, time of year, date, geographical positioning system coordinates, onboard clock, foundation orientation, cylinder positions, the linking mechanism's angles, valve positions and solar tracking sensor data, and where the computer uses polynomial spline curves. Further, the system includes a feedback control system that relays information gathered by sensor devices to the feedforward control system, where the feedforward control system and the feedback control system function in an integrated manner.

BRIEF DESCRIPTION OF THE SEVERAL VIEWS OF THE DRAWINGS

Preferred features of embodiments of the present invention are disclosed in the accompanying drawings, wherein similar reference characters denote similar elements throughout the several views, and wherein:

FIG. 2A is a detail showing the joint connector of a feedforward controlled solar tracker, according to an embodiment of the present invention;

FIG. 2B is a detail showing the linking mechanism of a feedforward controlled solar tracker, according to an embodiment of the present invention;

FIG. 3A is a detail showing the joint connector of a feedforward controlled solar tracker, according to an embodiment of the present invention;

FIG. 3B is a detail showing the linking mechanism of a feedforward controlled solar tracker, according to an embodiment of the present invention;

FIG. 22 is a front/side perspective view of a feedforward controlled solar tracker that utilizes a third ground mounted actuator to pull a chain or cable to provide a constant moment for the positions of the actuators, according to an embodiment of the present invention;

FIG. 22A is a front plan view of a feedforward controlled solar tracker that utilizes a third ground mounted actuator to pull a chain or cable to provide a constant moment for the positions of the actuators, according to an embodiment of the present invention; and FIG. 22B is a side plan view of a feedforward controlled solar tracker that utilizes a third ground mounted actuator to pull a chain or cable to provide a constant moment for the positions of the actuators, according to an embodiment of the present invention.

DETAILED DESCRIPTION OF THE EMBODIMENTS OF THE INVENTION

Figure 1:
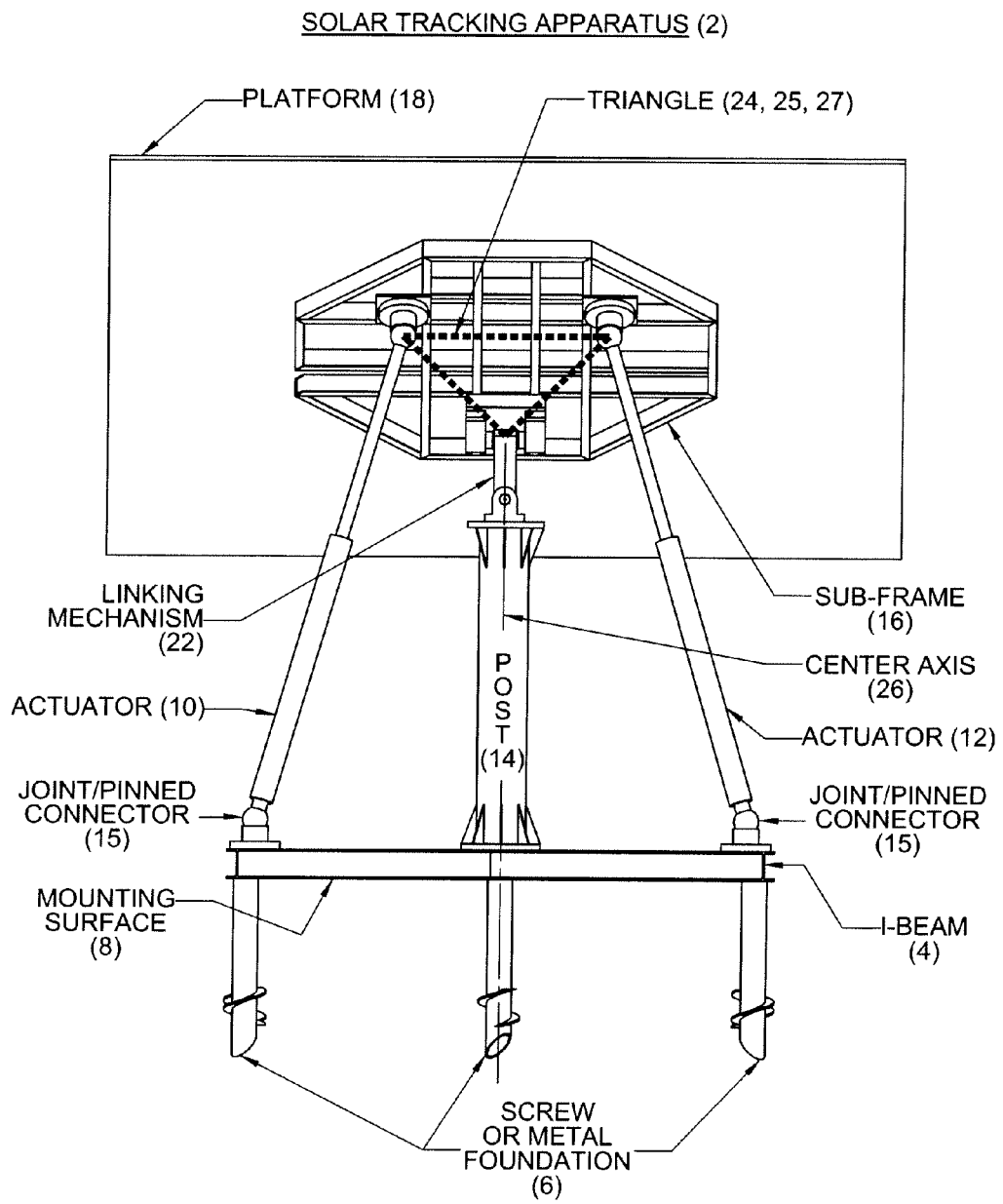
FIG. 1 is a front perspective view of a feedforward controlled solar tracker, according to an embodiment of the present invention.
Figure 2:
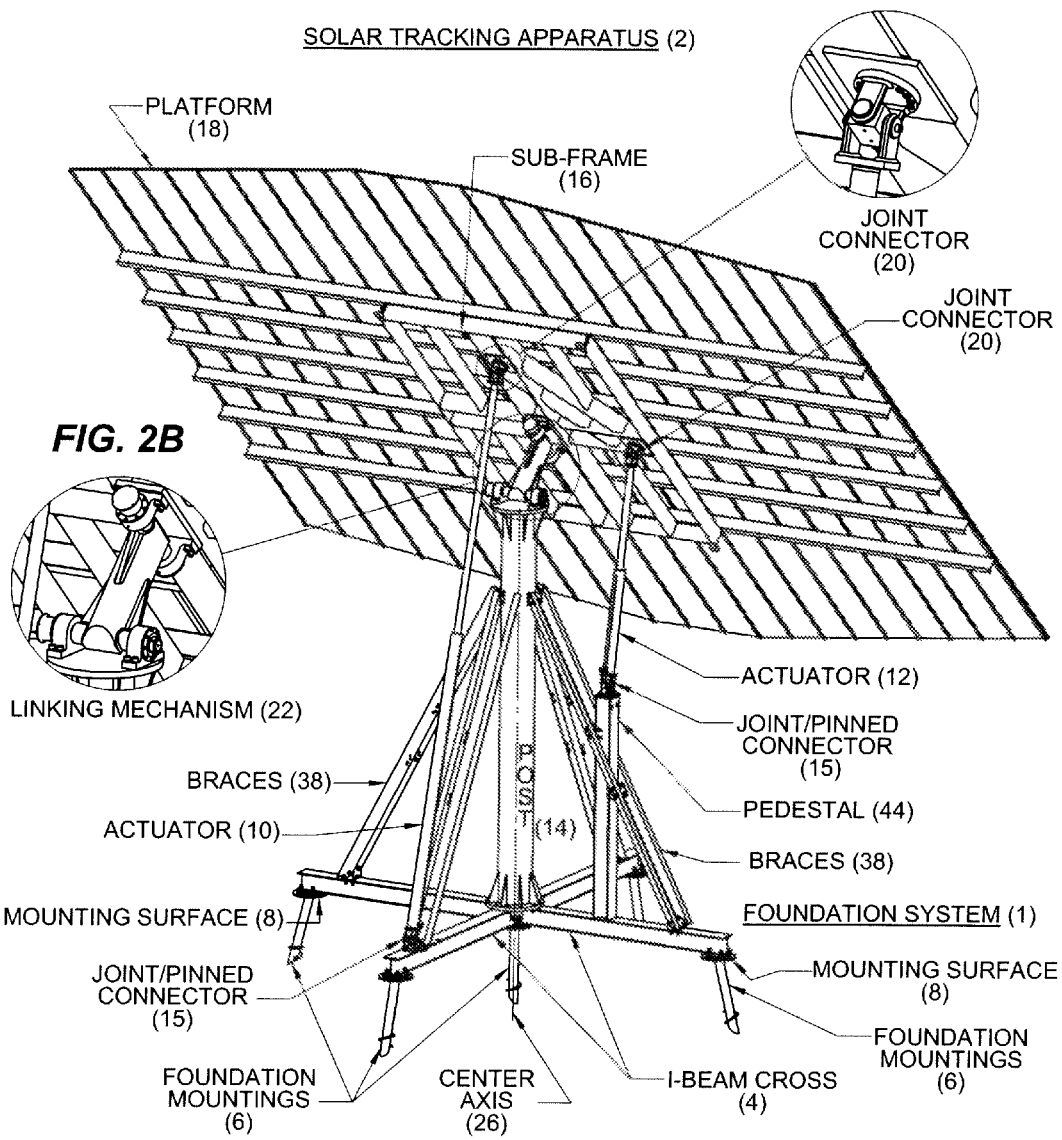
FIG. 2 is a front/side perspective view of a feedforward controlled solar tracker in the early morning position, according to an embodiment of the present invention.
Figure 3:
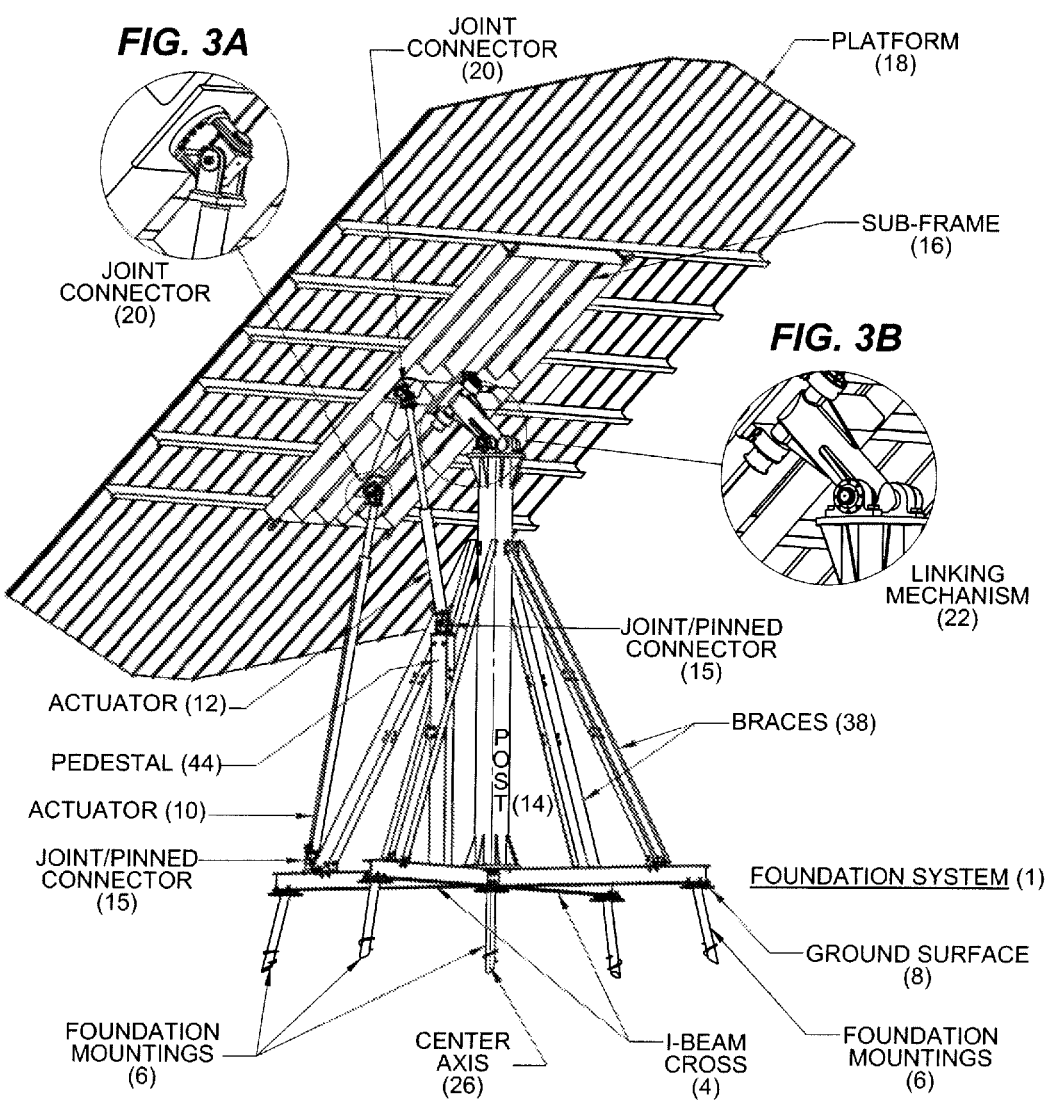
FIG. 3 is a side perspective view of a feedforward controlled solar tracker in the mid afternoon position, according to an embodiment of the present invention.
Figure 4:
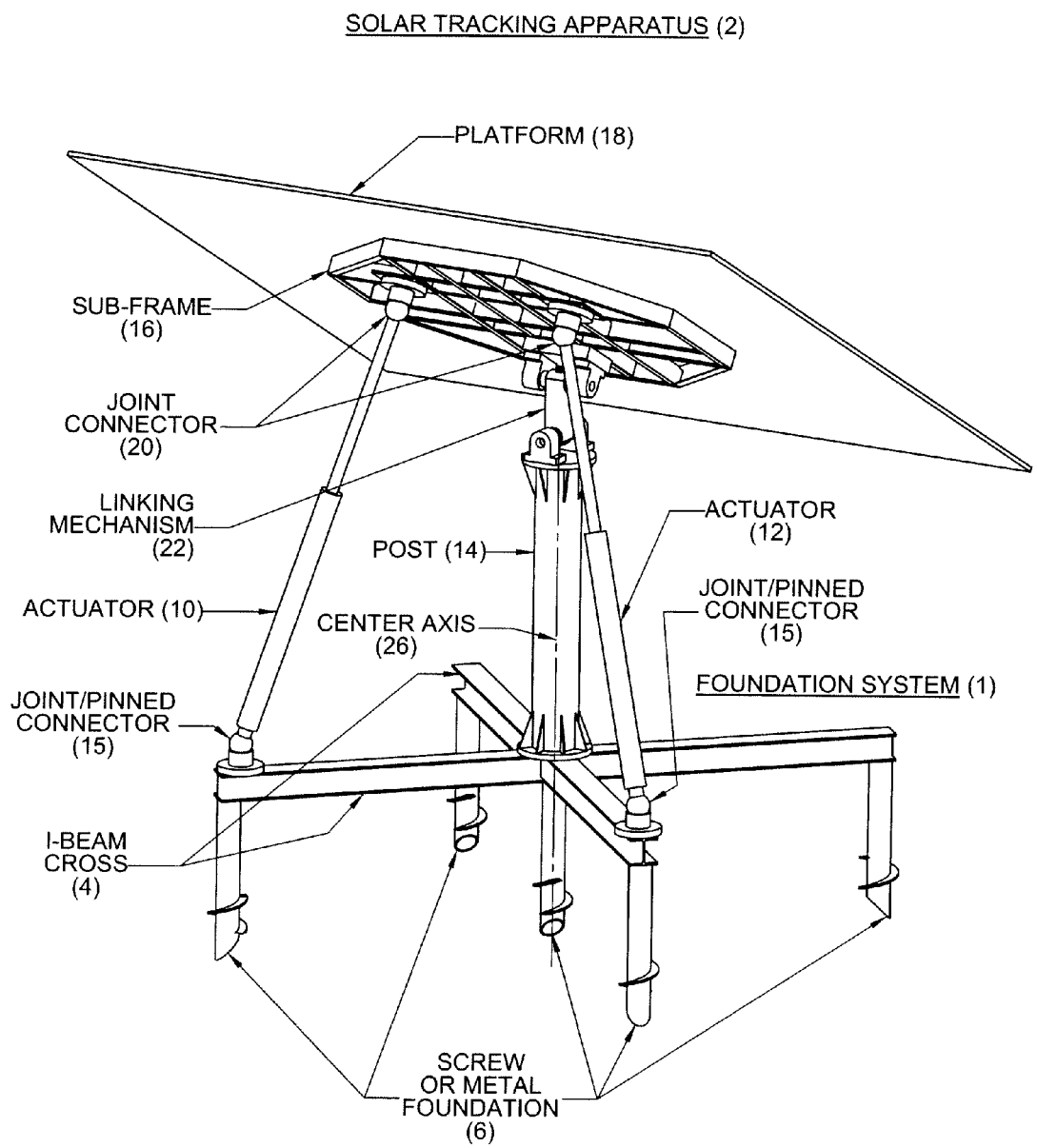
FIG. 4 is a front/side perspective view of a feedforward controlled solar tracker, according to an embodiment of the present invention.
Figure 5:
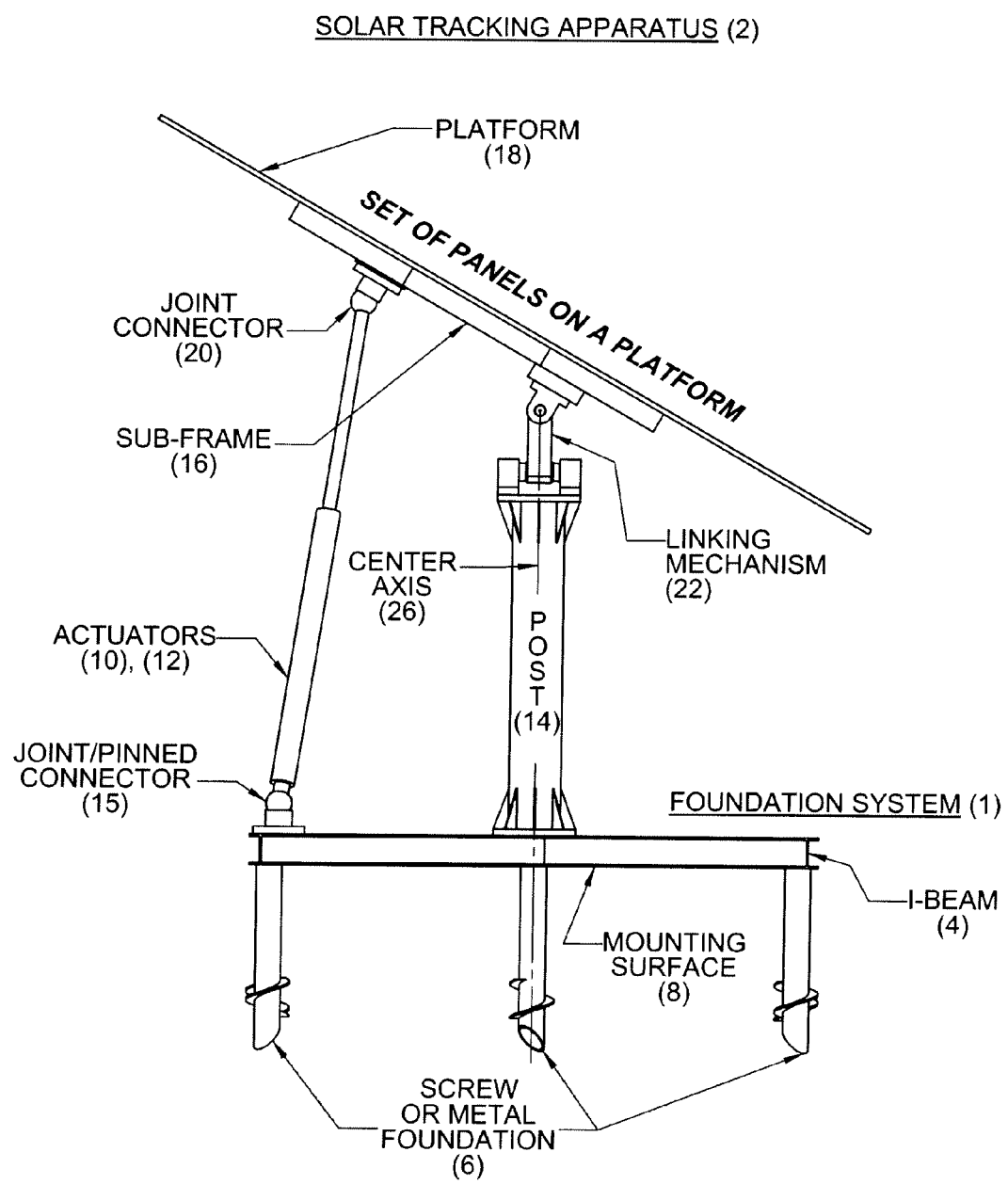
FIG. 5 is a side plan view of a feedforward controlled solar tracker, according to an embodiment of the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein.

In the following description, like reference characters designate like or corresponding parts throughout the figures. Additionally, in the following description, it is understood that terms such as "first," "second," and the like, are words of convenience and are not to be construed as limiting terms.

The embodiments of the present invention are directed to a platform for aiming solar power generating systems (and components, such as mirrors or photovoltaic cells "PV" and the like) such that the platform's sub-frame is positioned to optimize the capture of energy from the sun for conversion into electricity or other useful forms of energy. The embodiments of the present invention are optimized for strength, reliability, efficiency and maintainability. The embodiments of the present invention are also well suited for high wind conditions and can continue tracking the sun even in strong winds.

As depicted in FIGS. 1-5 and 17-18, in an embodiment of the present invention, the solar tracking apparatus 2 includes a foundation system 1 comprising an I-beam cross 4 and adjustable foundation mountings 6 (such as screws, metal foundations, or the like) that secure the I-beam cross 4 to the mounting surface 8 to which the solar tracking apparatus 2 is affixed. One skilled in the art will readily understand that the foundation mountings 6 may be adjustable or non-adjustable in embodiments of the present invention. Additionally, one skilled in the art will readily understand that different I-beam foundation systems may be utilized, including, but not limited to, a T-cross. Connected to the I-beam cross 4 are two linear actuators 10, 12 and a post 14. In an embodiment of the present invention, the linear actuators 10, 12 are preferably comprised of an east-west actuator 10 and a north-south actuator 12. The bottom end of the linear actuators 10, 12 are preferably connected to the I-beam cross 4 via pinned connections 15, joint connections, or the like. These pinned connections 15 allow the linear actuators 10, 12 to achieve two degree of freedom movement, relieve strain in the linear actuators, and they assure proper, free motion of the actuators. One of ordinary skill in the art will understand that, as used in the description of embodiments of the present invention, two degree of freedom movement refers to a manipulation that can cause motion in two independent forms such as two orthogonal axes or two orthogonal lines of motion, or one axis and one line. Additionally, a person of ordinary skill in the art will readily understand that the pinned connection can be a connection made by the use of a link with two pins, such that the link allows two degree of freedom movement. In a preferred embodiment of the invention as shown in FIGS. 1-5, the bottom end of the post 14 is rigidly anchored to the I-beam cross 4. This creates a two-pinned system in an embodiment of the invention. However, a three-pinned system in an embodiment of the invention may be preferred in which the post 14 is connected to the I-beam cross 4 via a pinned connection (not shown in figures). In a preferred embodiment of the present invention, the top end of the linear actuators 10, 12 and the top end of the post 14 are connected to a sub-frame 16, which holds a platform 18 that tracks the sun. In a preferred embodiment of the present invention, the platform holds or consists of a solar array. The linear actuators 10, 12 are connected to the sub-frame 16 via a joint connection 20 that allows the actuators 10, 12 to achieve two degree of freedom movement. In fact, both the pinned connections 15 at the bottom of the linear actuators 10, 12 and the joint connection 20 at top of the linear actuators 10, 12 are two degree of freedom pinned connections or the like that relieve strain in the actuators and assure proper, free motion. The post 14 is preferably connected to the sub-frame 16 via a linking mechanism 22 that allows the platform 18 to rotate about the post 14 with two degrees of freedom. In another embodiment of the invention the post 14 may be connected to the sub-frame 16 via a joint, similar to the joint connection 20 between the actuators 10, 12 and the sub-frame 16. A person of ordinary skill in the art will readily understand that there are different means for connecting both the post 14 and the actuators 10, 12 to the sub-frame. All embodiments described above creates a three-pinned system of connection between the sub-frame 16 and the tops of the post 14 and actuators 10, 12. In yet another embodiment of the invention, the actuators 10, 12 and the post 14 are connected directly to the platform 18 via pinned joints or linkages without a sub-frame 16.

The solar tracker's two or three-pinned connections 15 to the foundation system 1 and joint connection 20 and/or linking mechanism 22 connections to the sub-frame 16 provide adequate strength to withstand substantial forces while minimizing or avoiding transmission of certain torques into its foundation system 1. The lower torques associated with the connection points of the post 14 and actuators 10, 12 to the foundation system 1 and sub-frame 16 also provide for the capability of installing the system on rooftops. Most embodiments of the system are well suited for commercial roof truss spacing because the solar tracker's foundation system 1 is capable of spanning two or more trusses (which are typically eight to ten feet apart).

In a preferred embodiment of the present invention, the linear actuators 10, 12 also function as structural members. Use of the actuators 10, 12 as structural members creates operating strength while also reducing production costs. In a preferred embodiment of this invention the linear actuators 10, 12 are hydraulic cylinders that are driven by a hydraulic pump.

Figure 6A:
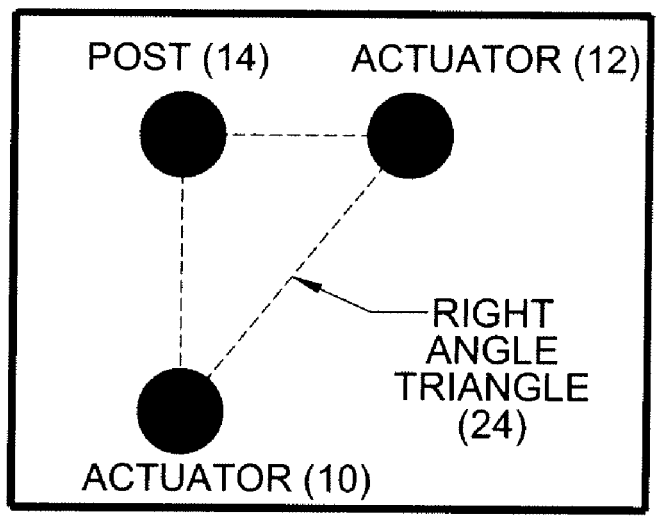
FIG. 6A is a depiction of the location of the bases of a feedforward controlled solar tracker configured in a right angle triangle position, according to an embodiment of the present invention.
Figure 6B:
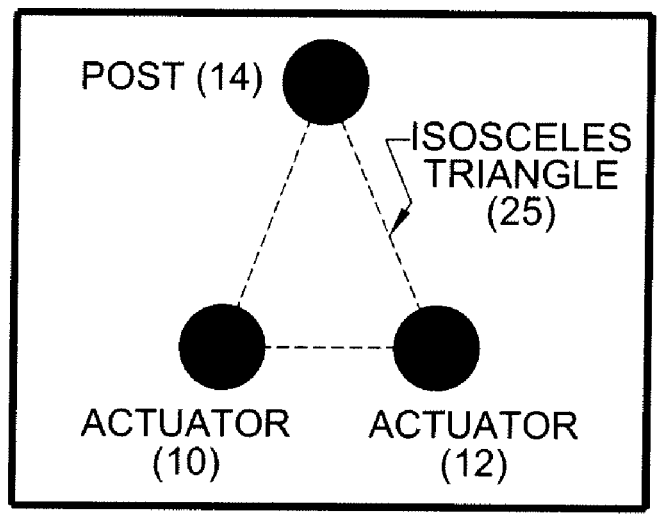
FIG. 6B is a depiction of the location of the bases of a feedforward controlled solar tracker configured in an isosceles triangle position, according to an embodiment of the present invention.
Figure 6C:
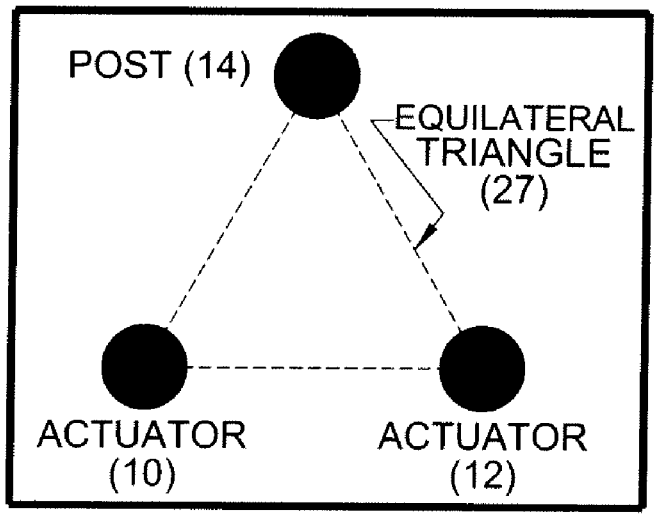
FIG. 6C is depiction of the location of the bases of a feedforward controlled solar tracker configured in an equilateral triangle position, according to an embodiment of the present invention.

As can be seen in the figures, and more specifically FIGS. 6A-6C, the connections of both the bottom and the top of the linear actuators 10, 12 and the post 14 to the foundation system 1 and sub-frame 16, respectively, preferably create a triangle shape. The dimensions of the triangles formed by the connections to the foundation 1 and the connections to the sub-frame 16 can be adjusted for different requirements in different embodiments. For example, standard PV panels have greater tolerance than mirrored or focused systems (i.e., concentrators). Standard panels can be controlled with a smaller system with smaller triangles and smaller actuators than focused systems, which require more exact aiming. FIG. 6A depicts a right angle triangle position ("RA" model solar tracker) 24; FIG. 6B depicts an isosceles triangle position ("ISO" model solar tracker) 25; and FIG. 6C depicts an equilateral triangle position ("EQ" model solar tracker) 27.

As shown in FIGS. 1-5, in an embodiment of the present invention, the foundation system 1 is comprised of an I-beam cross 4 and a number of removable, adjustable foundation mountings 6 (pilings, ground screws, helical ground anchors, or the like). In yet another embodiment of the present invention, the foundations under the three separate bases (post 14 and two actuators 10, 12) are replaced with a single foundation designed to support the three mounting locations. For example, a large concrete slab or the like could be used. In this embodiment the foundation system 1 comprises a concrete slab with adjustable mountings for an I-beam cross 4 or the like, or the three separate bases. The I-beam cross 4 is mounted such that its bases face north-south and east-west and is leveled by the adjustable foundation mountings 6. The actuators 10, 12 and center post 14 are preferably mounted to the I-beam cross 4. This system provides for rapid, strong, and inexpensive installations while also providing for inexpensive and total clean-up after the system is decommissioned after twenty to thirty years of service.

Figure 10:
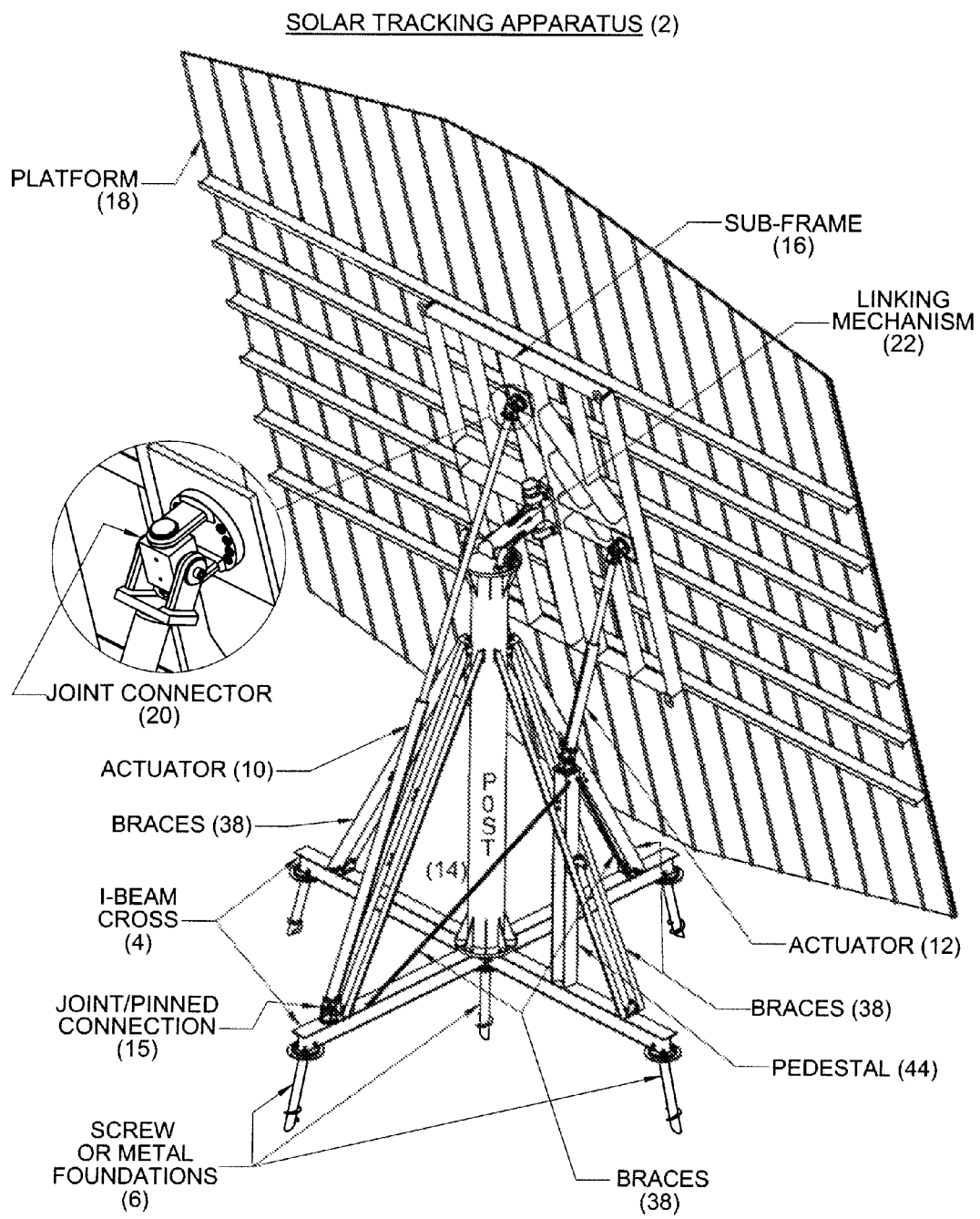
FIG. 10 is a front/side perspective view of a feedforward controlled solar tracker with a pedestal connected to an actuator base, according to an embodiment of the present invention.
Figure 11:
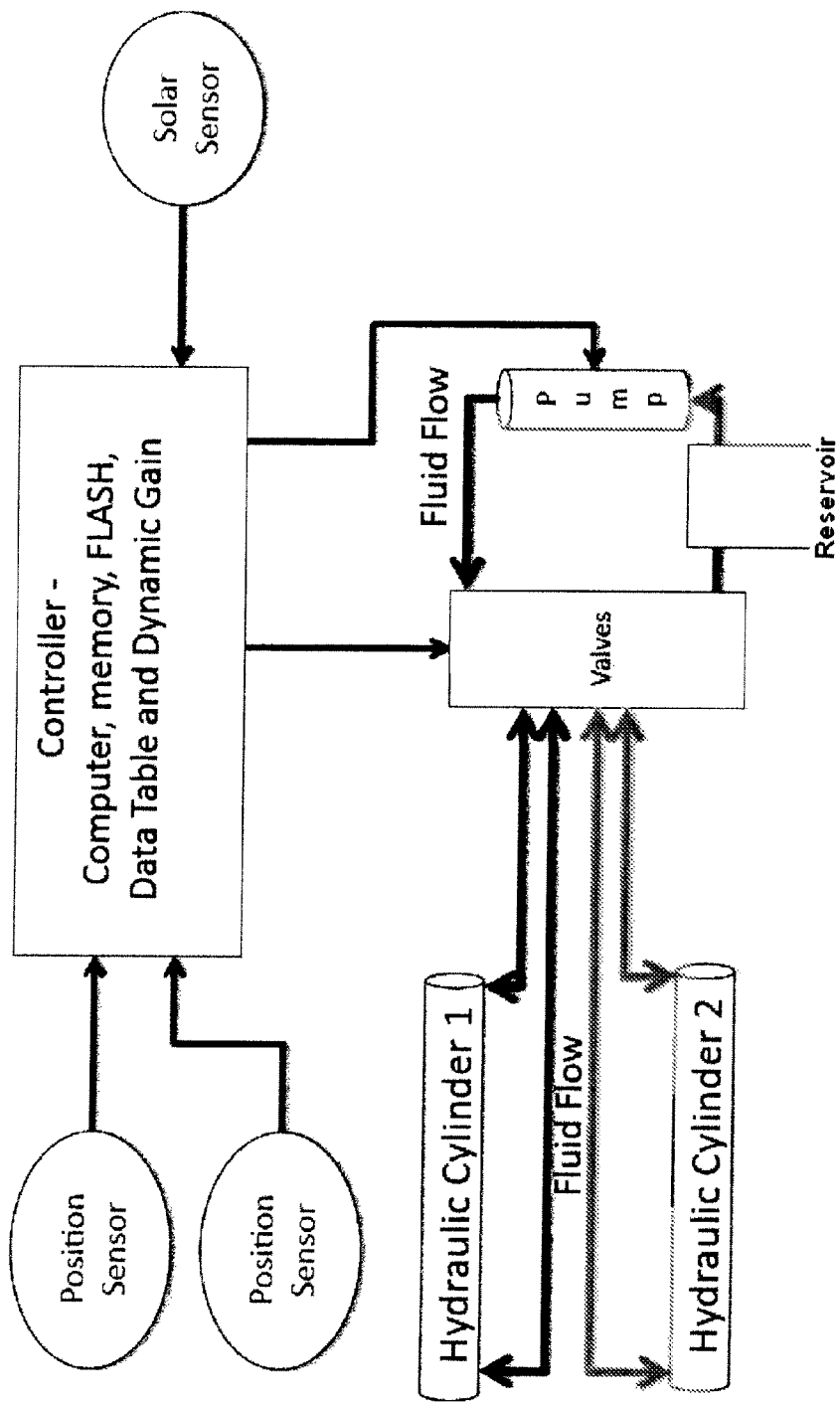
FIG. 11 is a flowchart illustrating the hydraulic system process of a feedforward controlled solar tracker, according to an embodiment of the present invention.

As can be seen in FIG. 10, in a preferred embodiment of the present invention, a pedestal 44 is added under the actuator 12, which causes the lower joints or pinned connections 15 of the actuators 10, 12 to be at levels different from one another. Causing the lower joint or pinned connection 15 to be higher on the base (of which actuator 12 is part) is desirable as it improves stability and strength of the solar tracking apparatus for certain angles of the east-west degree of freedom at the beginning and ending of solar days. Additionally, the pedestal 44 under the actuator 12 helps reduce strain and interference, and allow the solar tracker apparatus 2 to efficiently reach angles required to align the platform 18 orthogonal to the rays of the sun.

Figure 9A:
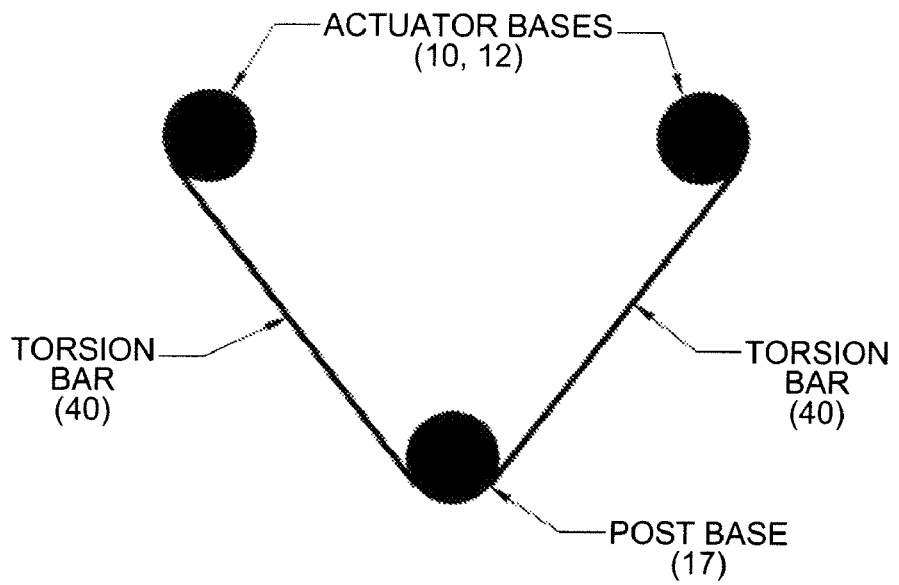
FIG. 9A is a depiction of the actuator bases and post base of a feedforward controlled solar tracker, which are stabilized by torsion resistance bars, according to an embodiment of the present invention.
Figure 9B:
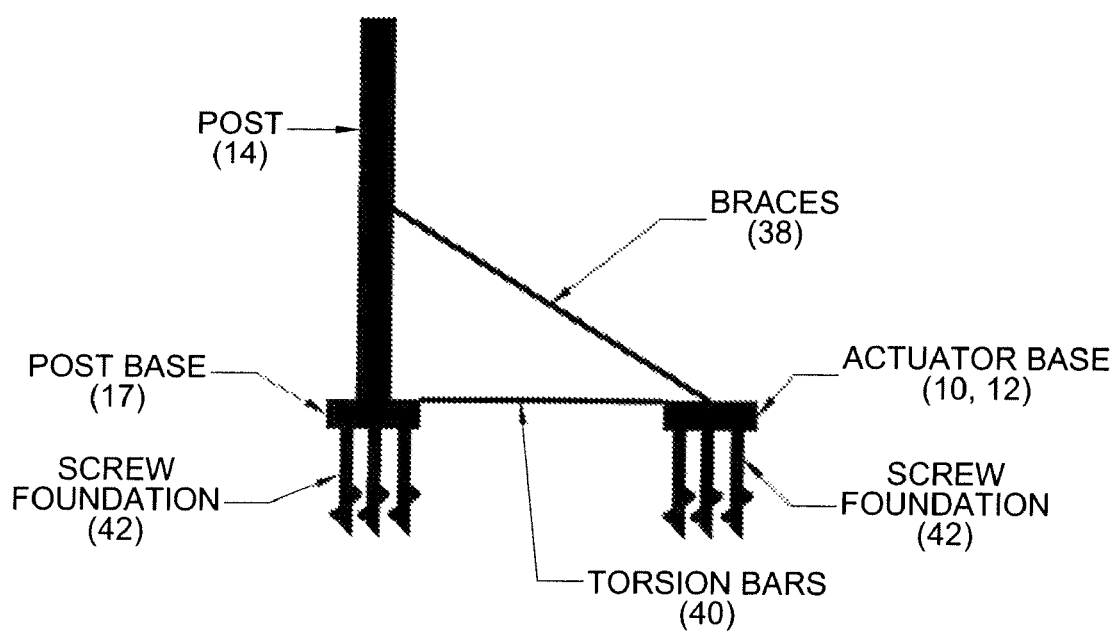
FIG. 9B is a side plan view of the post base and an actuator base of a feedforward controlled solar tracker, which are stabilized by a diagonal brace and a torsion resistance bar, according to an embodiment of the present invention.

As depicted in FIGS. 9A and 9B, in a preferred embodiment of the present invention, diagonal braces 38 attach to the post 14 at some height above the foundation 1 and to the foundation mountings of the actuators 10, 12 (cylinders in the hydraulic embodiment). These braces 38 provide additional strength and/or reduce the amount of material needed in the post 14 and thus reduce the cost of the post 14. In embodiments where the I-beam cross 4 is not used, braces or torsion resistance bars 40 may be used to connect the foundation mountings of the actuators 10, 12 and post 14 such that they are constrained from rotating. These connections act as long levers on the post base 17 while using the actuator 10, 12 foundation mountings as anchors to resist movement. Using the actuator 10, 12 foundation mountings in this way is particularly effective as the load on the actuator 10, 12 base would be perpendicular to the primary axis of the screw foundations 42 (or the like) giving the maximum resistance.

Turning back to a preferred embodiment depicted in FIGS. 1-5, the orientation of the linking mechanism 22 or joint at the top of the post 14 is fixed and capable of resisting rotational forces about its center axis. The post 14 itself is also designed to be capable of resisting such rotational forces transferred from the linking mechanism 22. This resistance keeps the solar tracking apparatus 2 standing erect and in calibration.

The mounting of the linking mechanism 22 at the top of the post 14 as well as the joints 20 at the top of each actuator 10, 12 is at an angle to optimize use of the linking mechanism 22 or joint 20 within their mechanical limits. Joints 20 at the tops of the actuators 10, 12 can optionally have some rotational freedom in addition to what is provided by the free rotation of the actuators 10, 12.

Figure 7:
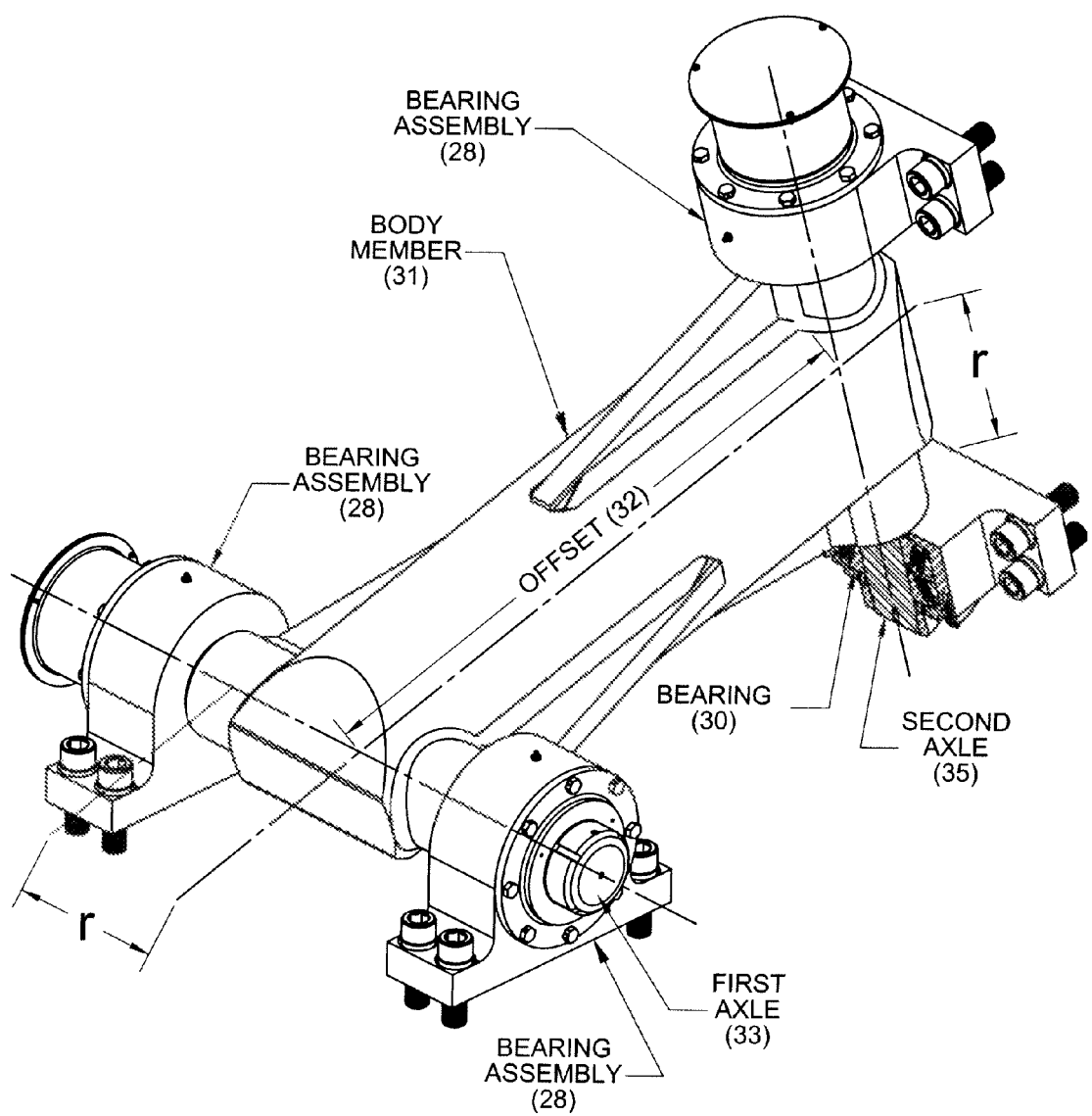
FIG. 7 is a front/side perspective view of a linking mechanism used to connect the post to a platform/sub-frame of a feedforward controlled solar tracker, according to an embodiment of the present invention.
Figure 8:
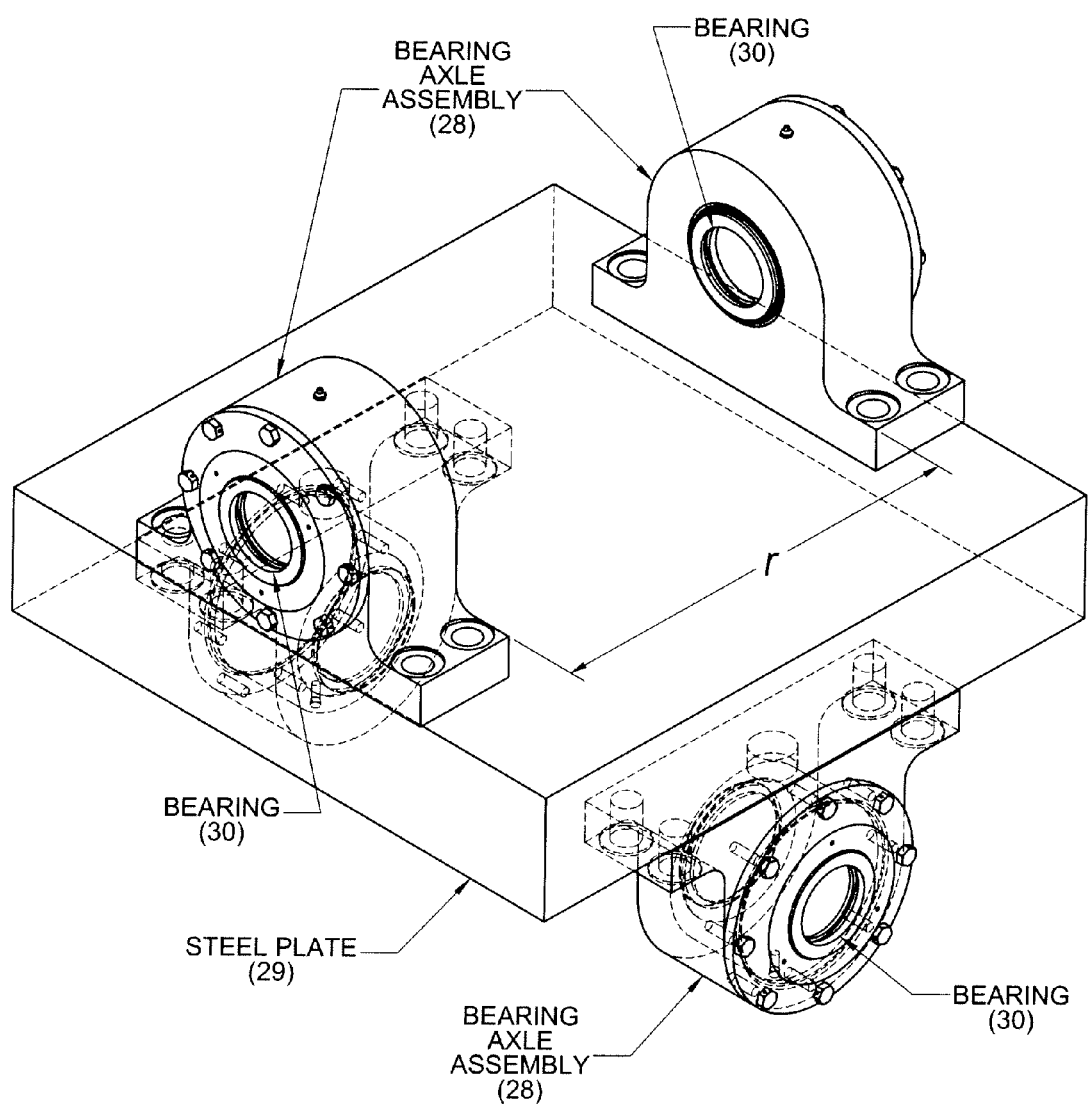
FIG. 8 is a front perspective view of a linking mechanism in the form of a pillow block bearing assembly used to connect the post to a platform/sub-frame of a feedforward controlled solar tracker, according to an embodiment of the present invention.

FIGS. 7 and 8 further depict the two degree of freedom linking mechanism 22 at the top of the post 14 in greater detail. The two degree of freedom linking mechanism 22 at the top of the post 14 is designed to be sufficiently strong to withstand very large torque forces. A preferred embodiment depicted in FIG. 7 shows a linking mechanism 22 designed to compensate for the maximum torque that might be caused by high winds. The linking mechanism 22 includes a body member 31 that connects a first axle 33 and a second axle 35. The first axle 33 and second axle 35 preferably include bearing assemblies 28, that are mounted orthogonal to each other to allow the linking mechanism 22 to achieve two degree of freedom movement. The radius "r" of the body member 31 causes the torque to be distributed into forces in each of two bearings/axle assemblies 28 such that the torque is resisted by each bearing 30.

A preferred embodiment of the post linking mechanism 22 depicted in FIG. 7 also provides an offset 32 comprised of the distance between the first axle 33 and the second axle 35 of the linking mechanism 22, center to center. This offset 32 acts to assure the sub-frame 16 has clearance past the post 14 even at sunset when the sub-frame 16 is oriented to point close to the horizon. The offset 32 also provides greater angular movement of the sub-frame 16 near the end of the linear actuator's 10, 12 stroke. The offset 32 also provides leverage for the actuator 12 when the actuator is near its retracted position.

The linking mechanism 23 depicted in FIG. 8 provides a more compact link than that of the linking mechanism 22 shown in FIG. 7, and provides fewer singularities for angles near the horizon. The linking mechanism 23 in an alternative embodiment of the present invention is substantially a pillow block bearing assembly. The fundamental differences between the linking mechanism 22 in FIG. 7 and the linking mechanism 23 in FIG. 8 are that the linking mechanism 23 in FIG. 8 has no axles (the axles are part of the post 14 and sub-frame 16), whereas the linking mechanism 22 in FIG. 7 has the axles 33, 35 as part of the link and the linking mechanism 22 has an elongated offset between axles compared to the linking mechanism 23 in FIG. 8. The linking mechanism 23 depicted in FIG. 8 includes a steel plate 29 or the like to assure proper orientation of the bearing assemblies 28. The disadvantage of the linking mechanism 23 in FIG. 8 is that it requires a slightly longer actuator to achieve the same angles as the post link 22 shown in FIG. 7. The linking mechanism 23 in FIG. 8 is not preferable in that it is not capable of reaching certain angles that are required to point at the sun for some locations and days of the year. Linking mechanism 22 is preferred as it provides the capability to reach extreme angles in order to align the sub-frame 16/platform 18 to a position orthogonal to the rays of the sun, particularly during sunrise and sunset.

As can be seen in FIGS. 7 and 8, the linking mechanisms 22, 23 are designed to provide minimal strain displacement even under heavy wind loads. The linking mechanism 22 preferably provides minimal clearance requirements for the bearings 30 and bearing/axle assembly 28 to minimize costs and strains in these components. The offset 32 distance between the axles 33, 35 causes the system to move in a fashion that closely resembles the solar system, thus one actuator 10 preferably provides time of day positioning while the other actuator 12 preferably provides day of the year positioning. The linking mechanism 22 body member 31 length determines the amount of angular movement that can be achieved without binding. Linking mechanism 22 length is optimized to provide the required freedom of movement at the lowest possible loading conditions for the actuators 10, 12. The linking mechanism 22 may be constructed of welded components rather than being formed of a solid piece of metal. The axles 33, 35 of the linking mechanism 22 are typically separate components that are welded or fastened into place in the twisted or fabricated component. The body member 31 of the linking mechanism 22 may also be fabricated from square stock, twisted flat bar, casting or the like.

A person of ordinary skill in the art will readily understand that, in alternate embodiments, ball joints or other types of joints may be used in place of the joints 20 and/or pinned connections 15. This is because the joints on the actuators 10, 12 may allow rotation. However, the joint/linking mechanism 22, 23 at the top of the post 14 cannot be replaced by a ball joint because it must hold the system in place resisting rotation, and it preferably has an offset length 32 (or joint/linking mechanism length) greater than zero. However, an alternative embodiment of the invention may allow for a linking mechanism with an offset length equal to zero.

Figure 16A:
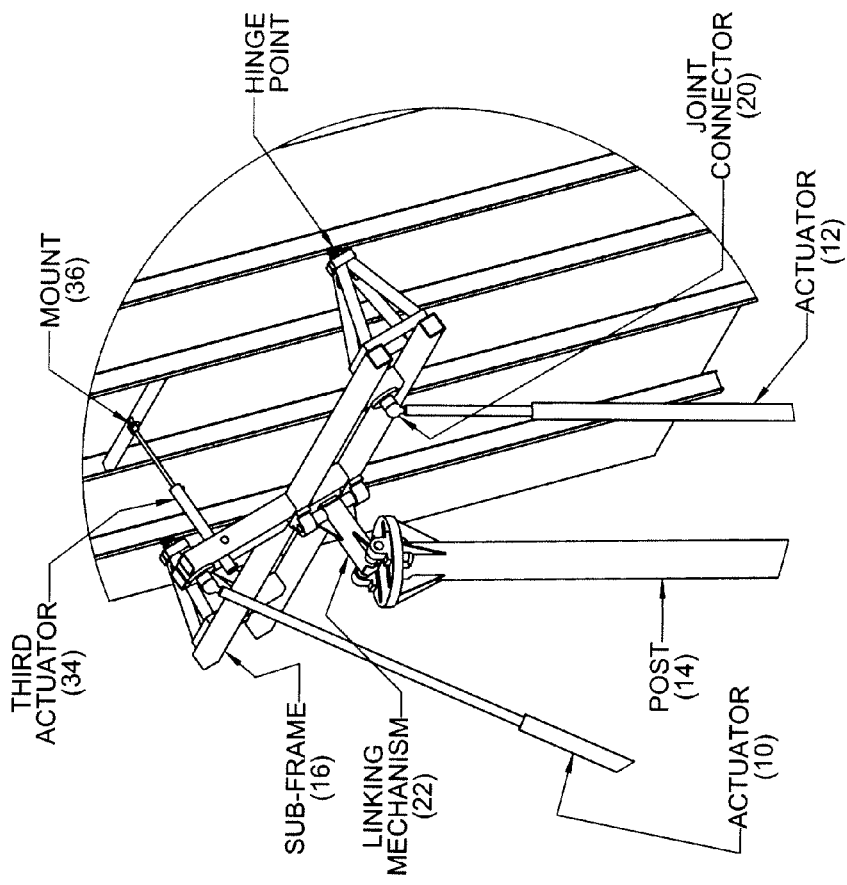
FIG. 16A is a detail further showing the mechanics of a feedforward controlled solar tracker with a third actuator, according to an embodiment of the present invention.
Figure 16:
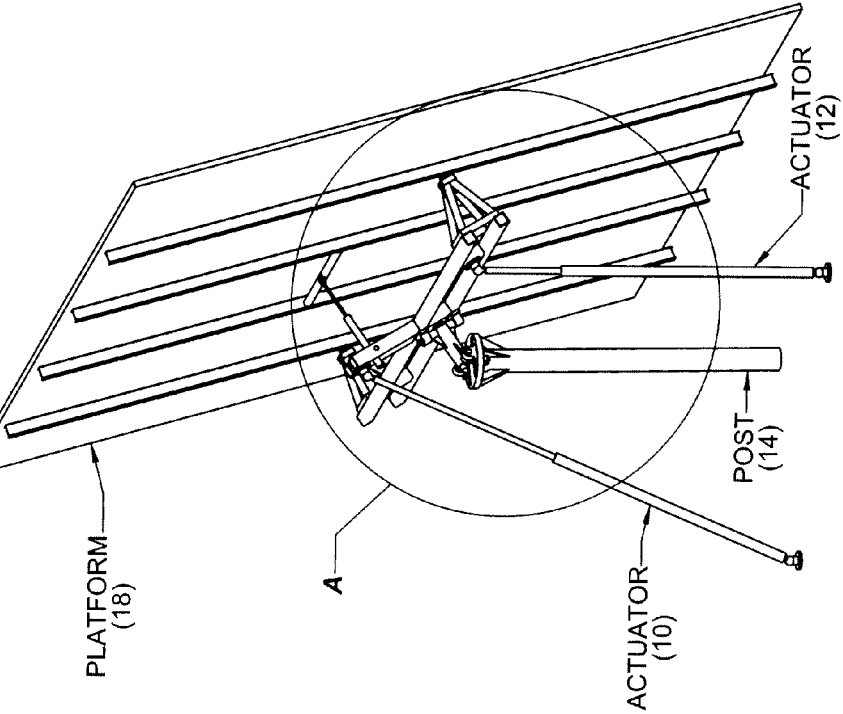
FIG. 16 is a side perspective view of a feedforward controlled solar tracker with a third actuator, according to an embodiment of the present invention.
Figure 17:
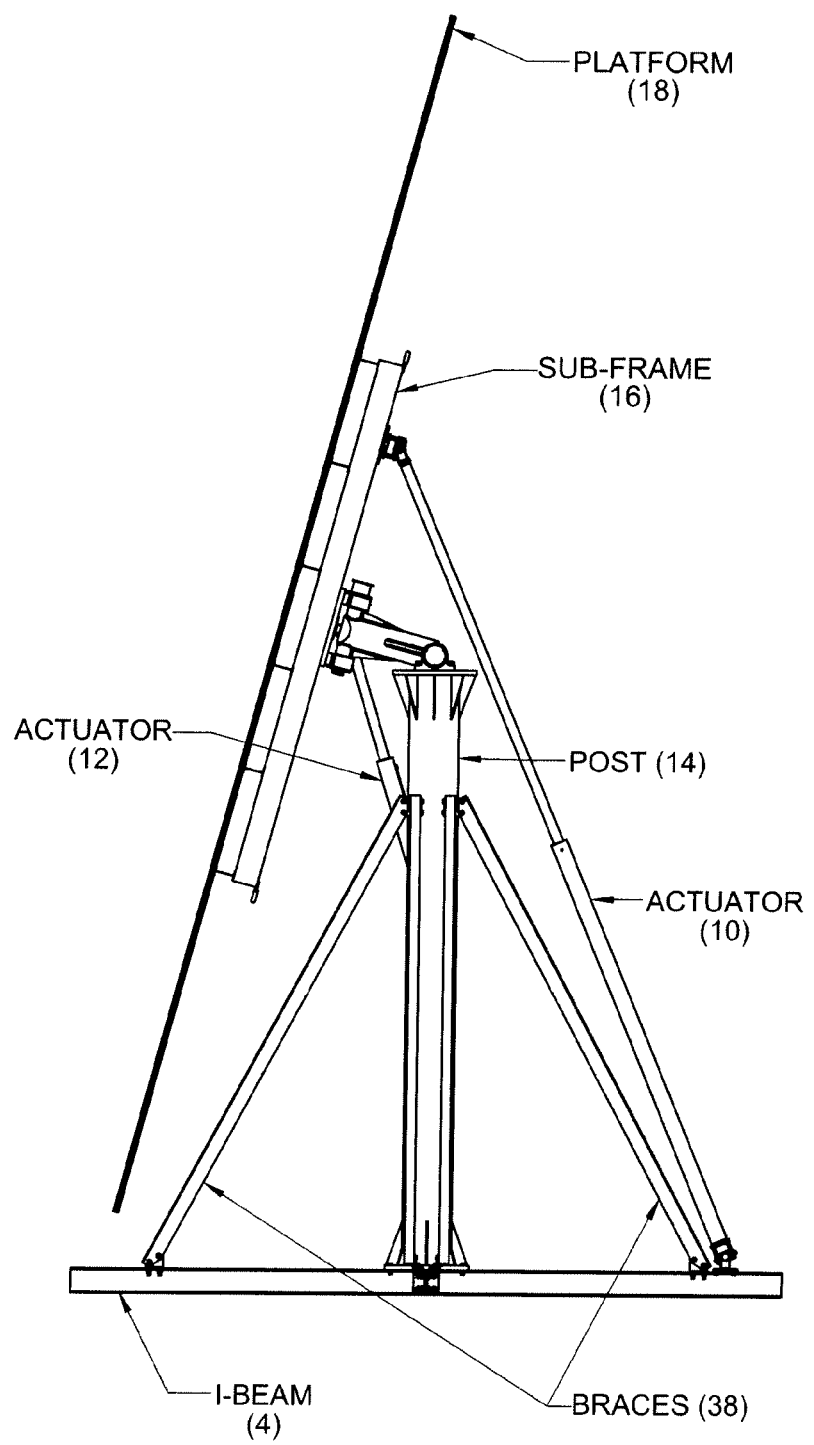
FIG. 17 is a side plan view of a feedforward controlled solar tracker, according to an embodiment of the present invention.
Figure 18:
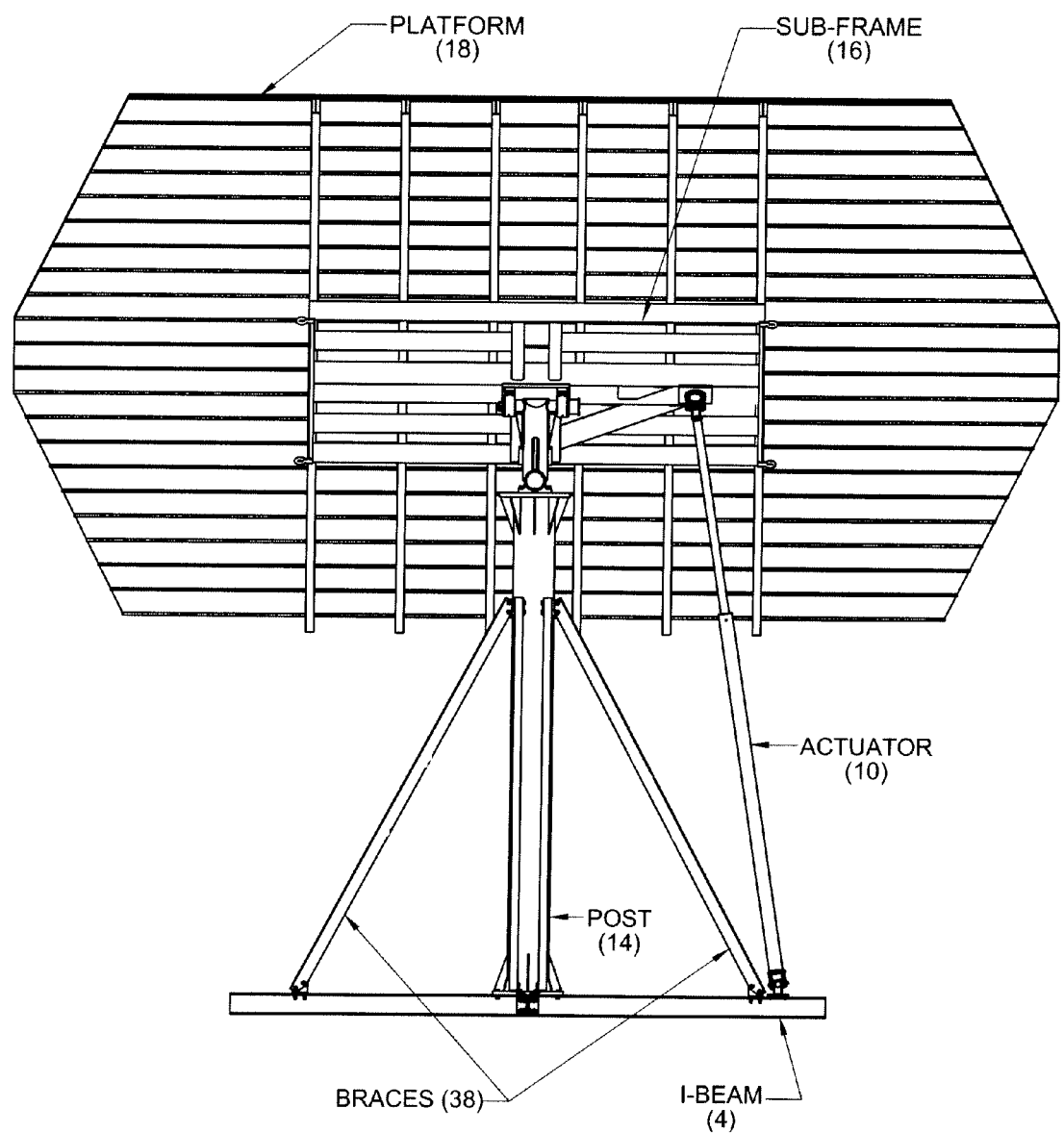
FIG. 18 is a front perspective view of a feedforward controlled solar tracker, according to an embodiment of the present invention.

FIGS. 16 and 16A depict the solar tracking apparatus 2 with the addition of a third actuator 34. Additional accuracy is achieved in the early morning or late evening by adding the additional actuator 34 to the sub-frame 16 such that the mounts 36 on one end of the platform 18 are raised at an angle to the sub-frame 16 such that this additional degree of freedom sweeps across the horizon (for the ISO model solar tracker) or down to the horizon (for the RA model solar tracker) to the exact position of sunrise or sunset for any given day of the year. Fixed or actuated elevation is added to the sub-frame 16 to optimize the solar tracking apparatus 2 for early morning or late afternoon/evening aiming. This added capability is desirable for certain types of solar panels and/or cases where power generation at or near sunrise/sunset is critical.

The solar tracking apparatus 2 is designed for rapid and cost effective deployments. The assembly process is aided by the system design in that multiple assembly steps can take place simultaneously: foundation system 1, sub-frame 16, structural component assembly (actuators 10, 12 and post 14) and the positioning and orientation of the foundation system 1. These simultaneous operations culminate in final assembly wherein a crane (or similar) is used to place the components so that they can be fastened together efficiently. The power supply to the solar tracker apparatus is any form of stable, clean power. In a preferred embodiment of the present invention, any electronic components in the system are provided with an enclosure for protection from weather and the like.

Several different embodiments of the solar tracking apparatus 2 are available for different uses. Each embodiment provides specific features for its specific function. As shown in FIGS. 6A-6C, these embodiments vary the triangle from a standard isosceles triangle 25 (FIG. 6B) to a preferable right angle triangle 24 (FIG. 6A) to an equilateral triangle 27 (FIG. 6C). Post 14 height and actuator 10, 12 and 34 lengths also vary to change performance characteristics.

Feedforward Control System:

A person skilled in the art would readily understand that there are different means that may be utilized to create a feedforward control system in embodiments of the present invention, including, but not limited to, having inputs of time of day, date, GPS coordinates, and foundation orientation. In a preferred embodiment of the invention, a computer control platform will use these inputs to acquire several sets of solar position angles for a given day. The computer control platform in the present invention preferably has input and output capabilities typical of a Programmable Logic Controller (PLC). Additionally, in a preferred embodiment of the present invention, the feedforward control system makes use of polynomial spline curves to drive the linear actuator 10, 12 and 34 positions. These spline curves are created by taking multiple known angular positions of the sun during the day and translating those angles into linear actuator 10, 12 and 34 positions based on the a relationship between the angular positions of the sun and the mechanical configuration of the particular embodiment of the present invention. These linear actuator 10, 12 and 34 positions become data points for the creation of the spline curve which is a function of "t"—time from sunrise to sunset. In some embodiments additional spline curves are also used to map the angles of the linking mechanism 22 axles 33, 35 and the time-function ratio of those angular positions and angular velocities are related to the linear positions and linear velocities of the actuators 10, 12 and 34.

Either a central computer or a computer located on each solar tracker is capable of calculating these spline curves overnight for the next day's use using previously stored data. In the case where a central computer is used to calculate the spline curves for all the solar trackers in an application area or all the solar trackers in more than one application area, each solar tracker has the ability to store a data table. This data table contains the coefficients for spline curves indicating actuator cylinder positions (or associated angles) and related motor speeds (or on-off cycles and valve positions) as a function of time and delta-t (time shift for GPS longitude location within time zone). Alternatively, each solar tracker could be equipped with sufficiently large memory capacity to store up to several years' worth of data tables. In some embodiments, multiple curve sets are provided in the data table with the correct curve set selected based on certain factors such as the date or the latitude as given by GPS coordinates with the associated time offset (location), or both date and location.

In an alternate embodiment of the present invention, data tables are used to control the system by using stored data for input versus time, without the use of spline curves. Another alternate embodiment of the present invention uses full solar calculations done in real-time. This embodiment uses feedforward control based on actuator positions and/or linking mechanism 22 angular positions, and rates of change directly translated from elevation and azimuth angles in real-time rather than using spline curves to indicate actuator positions and velocities. Yet another embodiment of the present invention uses neither feedforward control nor spline curves but rather uses a series of rules together with actuator positions translated from standard elevation and azimuth angles for solar position.

A preferred embodiment of the present invention utilizes the spline curve method for building the feedforward model. This is because the mathematics of real-time solar calculations and their respective derivatives requires much greater computational power and generates a significant error as well as potential for a plethora of singularities. This increase in complexity leads to an increase in hardware costs and reduces the accuracy and stability of the control system.

In a preferred embodiment, the spline curve method provides for incremental adjustments to the actuator 10, 12 and 34 velocities throughout the day with position adjustments being continuous (or so frequent and small that the motion increment is imperceptible or nearly imperceptible).

The spline curve used in a preferred embodiment of the present invention is typically a multi-segment, third degree polynomial in the form:

$$f_1(t) = a_1 \cdot t^3 + a_2 \cdot t^2 + a_3 \cdot t + a_4 \text{ for } t=0 \text{ to } t_a$$

$$f_2(t) = b_1 \cdot t^3 + b_2 \cdot t^2 + b_3 \cdot t + b_4 \text{ for } t=t_a \text{ to } t_b$$

$$f_3(t) = c_1 \cdot t^3 + c_2 \cdot t^2 + c_3 \cdot t + c_4 \text{ for } t=t_b \text{ to } t_c$$

$$f_4(t) = d_1 \cdot t^3 + d_2 \cdot t^2 + d_3 \cdot t + d_4 \text{ for } t=t_c \text{ to } t_{final}$$

Methods for solving such systems of equations are well known to those skilled in the art. The above example is a system composed of a sixteen by sixteen set of position equations that requires sixteen data points to define a unique solution. A combination of position requirements (for certain values of "t") and continuity constraints (between $f_1$, $f_2$, $f_3$, and $f_4$) define these data points. Higher degree polynomials with correspondingly larger systems of equations are used to make the linear actuator 10, 12 and 34 positions increasingly accurate for achieving desired angles of the sub-frame 16 and/or platform 18. The spline curves indicating the desired angles of the axis of the post linking mechanism 22 are used to produce a feedforward modification loop. The actual angles of the post linking mechanism 22 are compared with the desired angles to calculate the measured error. This error is multiplied by a gain that is used in the feedback loop to modify the feedforward control system.

A preferred embodiment of the feedforward control system includes the use of a time differential to minimize or eliminate motion hysteresis. By advancing time by a small increment ("delta-t") in the spline curve calculations, the time delay caused by the physics of the solar tracking apparatus' response and a circuit's response can be virtually eliminated. A "delta-t" term is used in each spline curve used for driving the solar tracking apparatus such that the drive and sensor feedback match more precisely. Real-time without the "delta-t" term is used for checking position and measuring error. This use of "delta-t" effectively reduces control error by one order of magnitude.

In alternate embodiments of the present invention, the spline curves may be 2nd, 3rd or higher degree polynomials in one or more segments.

The first derivative of the position equation is then used to determine the desired time rate of change for the actuator 10, 12 and 34. If hydraulic cylinders are used for the linear actuators 10, 12 and 34, this time rate of change is easily converted into fluid flow rate requirements by the computer and subsequent pump-motor speed/current requirements for the feed forward control system.

The feedforward control system provides very accurate and smooth control (such as pump motor speed control, pulse modulation to the drive(s) or valve fluttering) for the linear actuators 10, 12 and 34. This control strategy minimizes or eliminates overdriving of the actuators 10, 12 and 34, which reduces wear and strain on the actuators 10, 12 and 34 and other mechanical components and minimizes the electrical current draw and energy use.

Constraining the first, second, third and fourth derivative to be continuous between functions provides the smoothest operation and lowest wear for the mechanical components of the solar tracking apparatus 2. With these constraints the equipment has greater reliability.

In a preferred embodiment of the present invention, sensor feedback on actuator 10, 12 and 34 positions, linking mechanism 22 angles, or both is required to modify and update the feedforward control system. This creates a feedback control system. A person skilled in the art would readily understand that means for a feedback control system include, but are not limited to, having inputs of linear actuator positions, angular positions of the linking mechanism 22 axles 33, 35, and solar tracking sensor data. Wind resistance and changes in friction will change with environmental conditions and time. Compensation for these small changes is accomplished by multiplying the error times a small gain to adjust the actuator 10, 12 and 34 speed until the actual position matches the expected position. This error information is also multiplied by an even smaller gain to adjust power to the actuators 10, 12 and 34 for future movements thus making the feedforward model increasingly accurate over time for the then current environmental and mechanical conditions.

Communications capabilities help assure maximum up time. In another alternate embodiment the control system is equipped with secure interne communications for sending maintenance requests and/or responding to status inquiries.

The embodiments of the present invention preferably include one of the following categories for the configuration of the solar tracking apparatus:

1. Optimized for PV panel, ground installations between 30° and 50° latitude;
2. Optimized for PV panel, ground installations between 0° and 30° latitude;
3. Optimized for PV panel, ground installations with extreme latitudes greater than 50°;
4. Optimized for PV panel, rooftop installations between 30° and 50° latitude;
5. Optimized for PV panel, rooftop installations between 0° and 30° latitude;
6. Optimized for PV panel, rooftop installations with extreme latitudes greater than 50°;
7. Optimized for concentrated PV panel, ground installations between 30° and 50° latitude;
8. Optimized for concentrated PV panel, ground installations between 0° and 30° latitude;
9. Optimized for concentrated PV panel, ground installations with extreme latitudes greater than 50°;
10. Optimized for concentrated PV panel, rooftop installations between 30° and 50° latitude;
11. Optimized for concentrated PV panel, rooftop installations between 0° and 30° latitude; and
12. Optimized for concentrated PV panel, rooftop installations with extreme latitudes greater than 50°.

It should be noted that some embodiments optimize at angles other than 0°, 30° or 50°. In an alternate embodiment of the present invention, an additional level of optimization is added to provide maximum wind resistance for each of the above twelve categories.

In each of these categories, the triangle dimensions, platform 18 or solar array size, actuator 10, 12 and 34 lengths, and/or the post 14 height are adjusted to accommodate the specific needs of the particular embodiment. For example, standard PV panel installations require a lower cost system but have a greater angle of tolerance. Focused/concentrated systems have a small tolerance for error but are less costly than standard PV systems on a per watt basis.

For locations in North America, the latitude requires that the PV panels are preferably elevated above the horizon between a minimum and maximum angle at mid-day, specific to the particular location and day of the year. For ISO models (based on an isosceles triangle 25) all locations between certain latitudes require a specific post 14 height while a different post 14 height is required when outside of this particular range. Locations closer to the equator require a taller post 14 and locations farther north require a shorter post 14. In all cases for the ISO model solar tracker, the post 14 height is adjusted relative to the fully retracted actuator 10, 12 and 34 (cylinder) height.

Extra height may be added to all three bases to gain ground clearance for the solar panel array and frame mounted to the sub-frame. In an embodiment of the present invention, risers can be added under post 14 and actuators 10, 12 to provide extra height for ground clearance, or so a larger platform 18 may be mounted on a solar tracker. Risers may also be added under the entire foundation system 1, for example under the I-beam cross 4 to bring I-beams to level or to raise the height of the entire foundation. This use for leveling is preferred and of particular value for locations where the ground is sloped.

In an embodiment of the present invention, torsion resistance bars 40 are used to diagonally tie risers to the ends of the I-beam cross 4 component not passing over or under the riser. These torsion resistance bars 40 provide the risers with additional stability and resistance to torque.

Actuator 10, 12 and 34 capabilities can also be adjusted to meet different height requirements of the solar tracker. In any case, larger systems require larger components, including larger actuators 10, 12 and 34.

ISO systems (based on isosceles triangles 25) operating in northern regions of the northern hemisphere or far southern regions of the southern hemisphere benefit from an embodiment with a reverse orientation where the post 14 is taller than the retracted actuators 10, 12. In such a case the orientation would preferably position the post 14 away from the equator for an ISO model embodiment of the present invention. This is because the sunrise will appear farther north and south away from the equator during the summer and winter as the system installation location moves away from the equator.

As discussed above, in a preferred embodiment of the present invention, the linear actuators 10, 12 and 34 are hydraulic cylinders because hydraulic systems are well known for reliability and strength. Components are readily available and the supply of technicians capable of working on hydraulics is ample. In alternate embodiments, screw drives, pneumatics, or other linear actuators and the like may be used in place of hydraulic cylinders. In these alternate embodiments a motor is preferably used to drive the actuators. However, a person skilled in the art will readily understand that there are many means that may be used to drive the actuators, including, but not limited to, using pumps with valves, motors with gears, and motors with belts and pulleys.

The control system in a preferred embodiment of the present invention is a feedforward system based on expected angles for the position of the sun at a given time on a given date for a given set of coordinates. Inputs to the system may include (but are not limited to) time of day, date, GPS coordinates, foundation orientation, cylinder/angular position feedback, and solar tracking sensor data. The feedforward output controls motor speed and fluid flow rate. In certain preferred embodiments where hydraulics are utilized, the system also manipulates valve positions to control fluid flow directions. One adjustable valve or one or more binary valves function as dump valves to release excess fluid (if any) to flow back to a hydraulic reservoir. The control system causes the motor to drive the pump to produce nearly the exact amount of fluid needed to cause the required movements. Excess fluid flow will only be produced in cases where the fluid demand is so small that the motor and pump cannot accurately produce the desired flow rate. There are also times when excess fluid flow is produced when motion is stopped and the pump is running in stand-by mode (such as in a warm-up cycle).

As for the inputs in the system described above for an embodiment of the present invention, the time of day and date are acquired from a radio frequency ("RF") signal, a local server, a GPS system, an onboard clock, or the like. The GPS coordinates are acquired from an onboard GPS system, or are input by/from an external GPS and stored in flash memory. Alternatively, the GPS coordinates are acquired from a local server, or the like. The foundation orientation is input at setup and stored in flash memory, or input via sensors or the like. The cylinder positions are acquired in real-time or input via sensors or the like. The solar tracking sensor data is acquired in real-time or input via sensors or the like.

Expected sensor readings for actuator 10, 12 and 34 (cylinder) positions or linking mechanism 22 angles are also output by the feedforward system and are measured against actual readings of their positions to find control errors used in the feedback portion of the control system. These errors are then multiplied by relatively small gains to dynamically modify the pump speed (or motor speed) and valve positions to accomplish desired movements of the solar tracker. In a preferred embodiment of the present invention, the feedback system compensates for mechanical system changes over time, including, but not limited to, those in friction, and environmental condition changes, including, but not limited to, temperature changes.

For embodiments with solar feedback optimization, the outputs from the solar sensor(s) detecting the position of optimal solar input relative to the position of the platform 18 are multiplied by a relatively small, time cumulative gain to create slow and stable adjustments to the feedforward positioning within predefined limits from the feedforward values. This output is then translated into an adjustment to the actuator 10, 12 and 34 (cylinder) positions and finally converted to pump and valve signals. A sensor similar to a single two dimensional Charged Couple Device ("2D CCD") sensor with minimal optics and computing capability is used to find the center of brightness in this embodiment. However, other sensors with similar capabilities may also be used.

The known relationship recorded in the mathematical model between the actuator 10, 12 and 34 (cylinder) position's "time rate of change" (or first derivative) and motor speed for driving the hydraulic pump is a component of the control system. The first derivative of the spline curve equations provides the velocity of the rod that drives the actuators 10, 12 and 34 (cylinder). For hydraulic systems, knowing the cylinder bore and rod diameter allows the control system to calculate the fluid flow rate required to move the actuators 10, 12 and 34 (cylinder) at that speed. With the required flow rate the control system can use the cubic inch per rotation rating of the pump to calculate the required pump speed. The driver calculations for controlling the motor speed to drive the pump are then derived from the pump speed requirements to create the desired flow rate.

Because of the speed of the system the requirements for the motor size are minimal. A small but durable motor (similar in size to a vacuum cleaner motor) is all that is required to drive the system. Additionally, minimizing motor startups helps reduce wear on the motor. A small motor rated and regulated for continuous use is better than a larger motor that must be started and stopped frequently. The feedforward control system balances the drive so that on/off cycles are minimized. Minimizing valve cycles is also important to assure maximum reliability. The balance provided by the feedforward control system provides for minimal valve cycles.

In certain embodiments of the present invention, sensors are mounted to the actuator 10, 12 and 34 (cylinder) bodies or are mounted inside the cylinder bodies such that they detect the measurement of the total cylinder length from center of one joint to the center of the other joint. These sensors provide feedback data on the position of each actuator 10, 12 and 34 (cylinder) that is used in the control algorithm discussed above. However, a preferred embodiment of this invention calculates actuator positions based on linking mechanism angles as measured by encoders on each angle as it is more accurate and cost effective than measuring the actuator positions directly.

In the RA embodiment or the ISO embodiment of the solar tracker the sub-frame 16 of the present invention has multiple mounting holes for the attachment of the universal joints at the top of each actuator 10, 12 such that the adjustments can be made to accommodate various latitude and tolerance requirements. Using mounting holes that are spaced close together provides a greater reach for extreme sunrise and sunset angles while positions farther from the post 14 or other actuator 10, 12 offer greater accuracy.

In an embodiment of the present invention, full 360° rotation is achieved by using linear actuators 10, 12 with longer strokes (relative to the triangle height) and making the post 14 height equal to the actuator's 10 mid-stroke length.

Sensors: In certain embodiments the control system has one or more types of sensors for each degree of freedom. These sensors include, but are not limited to, encoders, linear sensors, level sensors, and vision sensors. Encoders may be used to measure angles directly from the linking mechanism axles 33, 35. Linear position measurement sensors such as Magnetostictive, laser, Ultrasonic (e.g., those manufactured by MTS), or the like may be used to measure linear actuator 10, 12 and 34 lengths. A gyroscope, mercury switch or other device is used to measure when the platform 18 is level. A machine vision system and/or photocell (or similar) can optionally be included as part of the control system in certain embodiments. The vision system is used to measure the angular error between the solar tracker position and the actual position of the sun. This measured error is used to modify or calibrate the control system and reduce error.

In an embodiment of the present invention, sensors to measure elevation and azimuth angles may replace or augment sensors on the linear actuators. These angle measuring devices will help assure the system operates within the tighter tolerances of focused, concentrated, or mirrored collectors. Additionally, in an embodiment of the present invention, integrated data from the energy system may be added to the other data inputs mentioned above and made available to owners and maintenance providers through the present invention's optional internet connection. In certain embodiments of the present invention, solar sensor feedback may be added to verify tracking is correct. This involves directly sensing the position of the sun relative to the line orthogonal to the face of the platform 18 by measuring system power output.

In alternate embodiments, solar angles may be provided in real-time and translated directly into linear actuator positions with derivatives extracted by use of difference calculations. These translations and calculations are used as an alternative to the spline curves described above.

Day time calibration: In an embodiment with a photocell or similar detector being used, the sensors are located at the bottom of a hollow tube mounted such that the tube's main axis is aimed orthogonal to the plane of the platform 18. The tube size and length is selected to assure the desired degree of accuracy is confirmed when the sensor can and cannot detect the sun. Alternatively, the measured output of electrical energy from one or more solar panels on the tracker may be used to sense that the sun is within the acceptance angle of the platform 18 and solar panel. In the case of using electrical output, the ramp up and ramp down of power provides additional information about the sun's position relative to the current calibration of the control system. If the sensing strategy does not detect the sun for more than a given amount of time, the control program moves the platform 18 outward in concentric circles (the central axis orthogonal to the platform 18 sweeps out circular search patterns with each iteration increasing the radius of the circle) from its original position until it detects the sun or reaches a preset maximum angular offset from its then current calibration. If the maximum allowable offset is reached the solar tracker goes back to the original trajectory and continues tracking for a set amount of time. If the sun is again detected by the sensor, tracking continues as normal. If not, the search sequence is initiated again. If the sun is found during a search, calibration offsets are set for the angles associated with each axle 33, 35 of the linking mechanism 22. If the sun is not located before a set number of search sequences are completed, the tracker sends a message requesting maintenance for recalibration. To find the center of the sun the tracker continues its then circular path until it reaches the farthest point along the path where the sun is detected. The time and length of the arched path where the sun is detected are measured and this geometric information is used to calculate the center of the sun based on the known expected geometry of the appearance of the sun for the given day and GPS coordinates.

An embodiment of the present invention uses a machine vision sensor that operates in a similar way but is faster because its concentric circles are performed in software rather than on the solar tracker apparatus. In alternative embodiments of the present invention, sensors measuring the electrical output of the solar panel system are used in lieu of optical sensors or the like that detect the sun.

In a preferred embodiment of the present invention, the positions and times of where and when the sun is first detected and last detected are recorded and used in calculations that take advantage of the known circular pattern of the solar tracker's motion, the known motion of the sun across the sky, and the known apparent size and geometric characteristics of the sun to find the center of the sun.

Nightly calibration: Each night the solar tracker goes into a position where its platform 18 is level and the system checks its position against the level sensor (gyroscope or similar). If the level position is confirmed within a certain tolerance the sequence is complete. If the system is out of tolerance, a search sequence similar to a daytime search is conducted to find the level position and offset angles are set as discussed above, or as applied to azimuth and elevation inputs to the spline curve generation only with a greater maximum search area.

Communication: In a preferred embodiment the system is equipped with a combination of fiber optic, wireless, and/or wired local ethernet networking or the like to communicate with a local server which possesses an internet connection. Depending on the number of trackers within a solar field, a number of local servers act as a supervisory control system and data acquisition systems ("SCADA system") for a group of solar trackers. The SCADA system uses an internet connection to sync its local clocks to remote atomic clocks on a daily basis. The SCADA system then syncs its real-time clock to the real-time clocks of the solar trackers on a nightly basis or at power-up. In addition, the SCADA system relays any additional information required for the nightly spline curves wherein inputs such as time, position coordinates of the solar tracker, and angular position of the sun or spline curve coefficients can be acquired. The SCADA system also acts as a data concentrator, as well as performing functions such as monitoring alarms, collecting data and the like. Messages and reports can also be sent from this connection (e.g., a request for maintenance).

In any of the calibration methods mentioned above, the corrections may be used as output in the control system to improve performance or as inputs to a feedforward control system such that the outputs of the planned trajectory incorporate the calibration corrections.

Wind relief: In a preferred embodiment the solar tracking apparatus 2 is designed such that its actuators 10, 12 and 34 moves in order to comply with the force of heavy winds in order to prevent any system components from breaking or bending. In systems with hydraulic actuators 10, 12 and 34 this is accomplished through the use of counterbalance valves mounted on each cylinder. The counterbalance valves are set to relieve the hydraulic pressure that exceeds the pressure needed for normal wind conditions. Fluid relieved under this condition flows between both sides of the cylinder and a reservoir tank. This relief function of the counterbalance valves is proportional to the force of the wind. The valve will open only as needed resulting in a minimal cylinder displacement. After the wind gust subsides, the drive system brings the cylinder back to recover its position within a certain tolerance. Recovery time will vary with the amount of displacement but will always be accomplished within a few minutes. This feature protects the system from damage in high winds and allows for the capture of solar energy at much higher wind speeds than has been possible with other solar trackers.

In an embodiment of the present invention the hydraulic reservoir is in the post. A portion of the interior of the main post is used to house the hydraulic fluid.

A person of ordinary skill in the art will readily understand that bumpers or the like may be used in embodiments of the present invention as a means to prevent the solar tracking apparatus from being driven past its mechanical limits. As such, in an embodiment of the present invention, bumpers are provided to prevent the solar tracking apparatus from being driven past its mechanical limits. These bumpers keep the solar tracking apparatus from being damaged or moving in an undesirable direction in windstorms. In the event of a power failure during heavy winds, the wind relief system and bumpers preference the system to move toward a horizontal position where wind loading will be at a minimum. If heavy winds are not present during a power failure, the system holds its position until power is restored.

Balance: The solar tracking apparatus 2 is preferably balanced about the linking mechanism 22 such that ground clearances are maximized and wind loading is channeled to promote moving the platform 18 to a horizontal position. These conditions also help minimize actuator 10, 12 and 34 loads under most circumstances. Balance in this case is by geometry rather than mass.

Fluid: In an embodiment utilizing hydraulic cylinders, the system is preferably well suited to use biodegradable oils because of the design for low operating pressures and duty cycles. These environmentally friendly fluids also reduce costs for clean-up and maintenance.

Hose failure: As discussed above, in an embodiment of the invention, counterbalance valves are mounted directly to the cylinders. In the event of hose failure, the counterbalance valves hold the cylinders in place until hydraulic power can be restored. If the hydraulic fluid supply drops to the point that no cylinder movement is possible, then the control system will sense this condition and automatically shutdown. In any case the amount of fluid spilled will be minimized. All fittings and seals and hoses in the system are made with the latest technology and best quality to assure minimal maintenance requirements and lowest probability of leakage or spills.

In an embodiment of the solar tracker apparatus, separate pumps and motors (or bi-directional pumps and motors) are used for each cylinder as an alternative to valve controls from one pump to multiple cylinders.

Another embodiment of the present invention makes use of multiple layers of manipulation where a second, third, or fourth base system is mounted on top of other systems such that the manipulation is cumulative. This stacked approach provides greater freedom of manipulation and reduces the impact of the mechanical limits of the joints.

In an embodiment of the present invention, auxiliary actuation of the sub-frame along a single axis or multiple axes offers greater freedom and accuracy on the chosen axis. For example, some embodiments of the present invention have minimal or no articulation across the horizon (azimuth axis). These configurations benefit from being able to rotate north-south for the location of the sunrise/sunset on the horizon.

Further, an embodiment of the present invention may utilize auxiliary actuation of the base as an alternate way of adding flexibility and accuracy. In such a case the foundation mountings of the actuators and post are each attached to a single rotating base.

An embodiment of the present invention may utilize damping such as struts or the like that are added to eliminate vibrations and further reduce wear.

Additionally, an embodiment of the present invention may be used for alternate purposes such as for aiming a satellite dish, drive mechanism (such as a propeller or jet engine), or as a mounting/aiming system for weapons.

An embodiment of the present invention does not use feed forward control. In this alternate configuration the spline curve positions are used as inputs for standard Proportional-Integral-Derivative ("PID") control.

In alternate embodiments, additional articulation may be added to rotate the linking mechanism 22 at the top of the post 14, rotate the entire post 14, or rotate the entire apparatus 2. The primary reason for doing so is to increase the accuracy of the system in the early morning and/or late afternoon. For certain conversion equipment to be mounted on an embodiment of the present invention, the power generation opportunity increases by one to two hours for both sunrise and sunset if the additional articulation is added.

In alternate embodiments of the present invention, the solar tracking apparatus may be mounted in orientations other than horizontal. For example, the system may be mounted on the side of a building, on a hillside, or the like. These locations will offer less exposure to the sun in total but will benefit by a greater efficiency from tracking the sun when there is exposure.

In another alternate embodiment of the present invention the post height is actuated. A linear actuator or the like is used to move the top of the post up and down while the joint is held from rotating about the axis of the post by the actuator or framing external to the actuator. This embodiment provides greater range of motion for the platform with less stroke length in each actuator.

A person of ordinary skill in the art will readily understand that embodiments of the present invention are not limited to only two actuators. In an embodiment of the present invention, a third actuator may also be attached in a fashion similar to actuators 10, 12 directly to the sub-frame 16 such that it is on the opposite side of the post 14 and symmetric to the east-west actuator. This third actuator would serve the same purpose as the east-west actuator, thus increasing strength and stability.

Figure 12A:
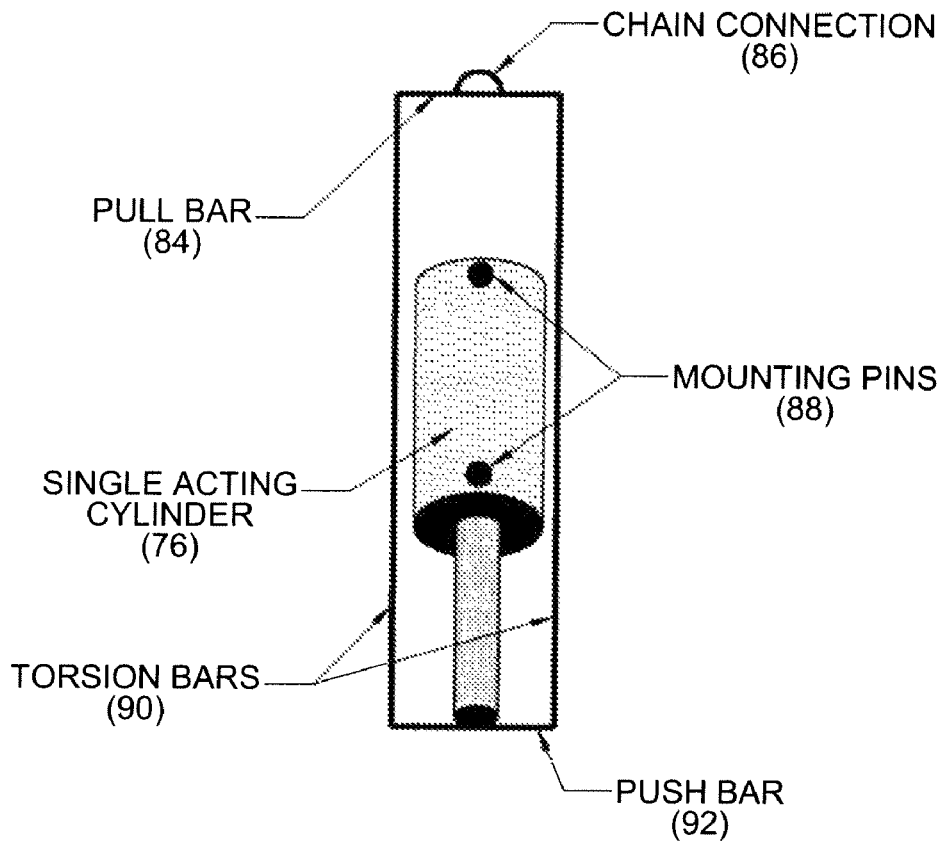
FIG. 12A is a front perspective view of an inverted single acting actuator cylinder of a feedforward controlled solar tracker, according to an embodiment of the present invention.
Figure 12B:
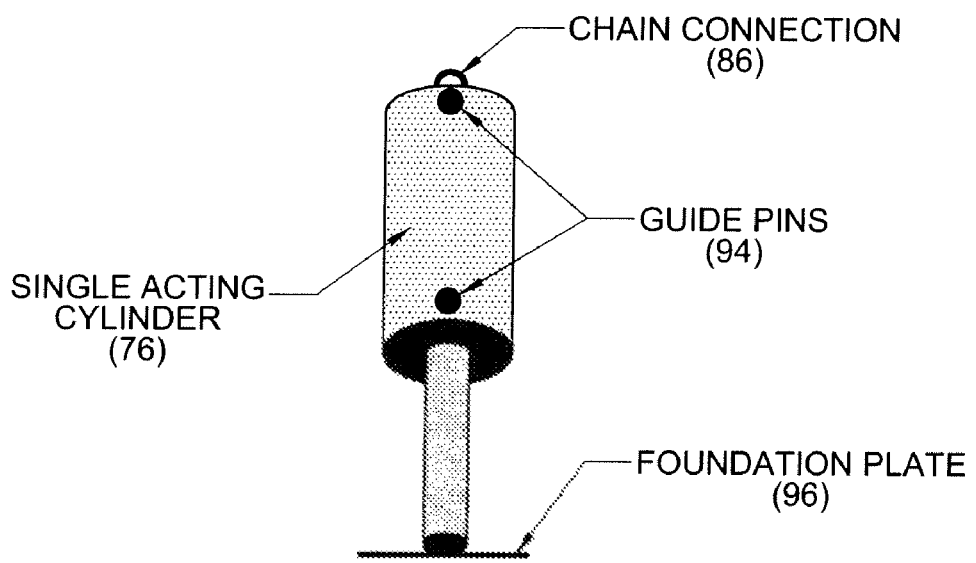
FIG. 12B is a front perspective view of an inverted single or double acting actuator cylinder of a feedforward controlled solar tracker, according to an embodiment of the present invention.

As shown in FIGS. 12A and 12B, in an embodiment of the present invention, the system utilizes one or more inverted cylinders 76. These cylinder configurations provide a pulling force only, and have the advantage of gravity pulling debris away from the rod seals 78.

Figure 13:
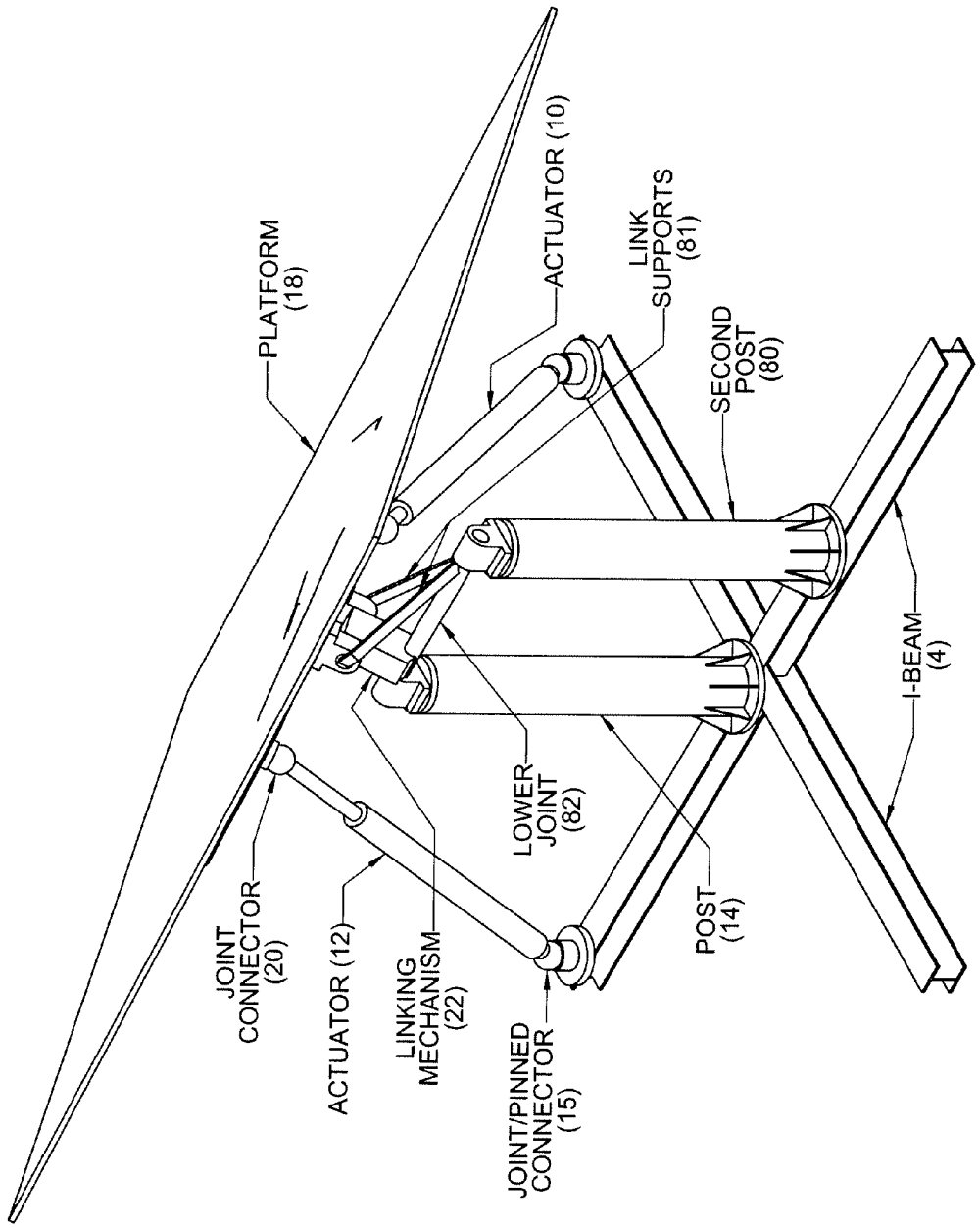
FIG. 13 is a front/side perspective view of a feedforward controlled solar tracker with two posts, according to an embodiment of the present invention.
Figure 14:
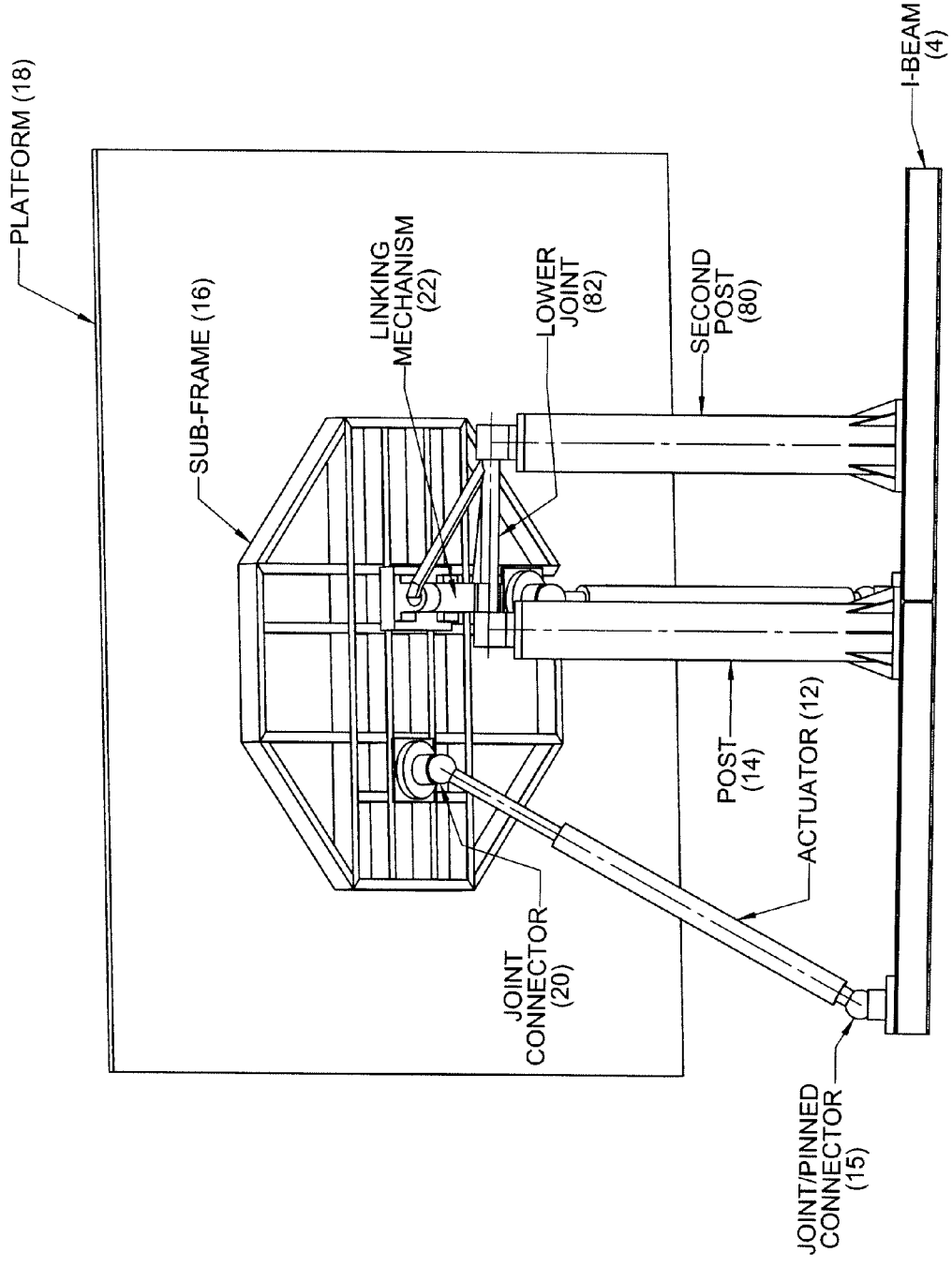
FIG. 14 is a front perspective view of a feedforward controlled solar tracker with two posts, according to an embodiment of the present invention.
Figure 15:
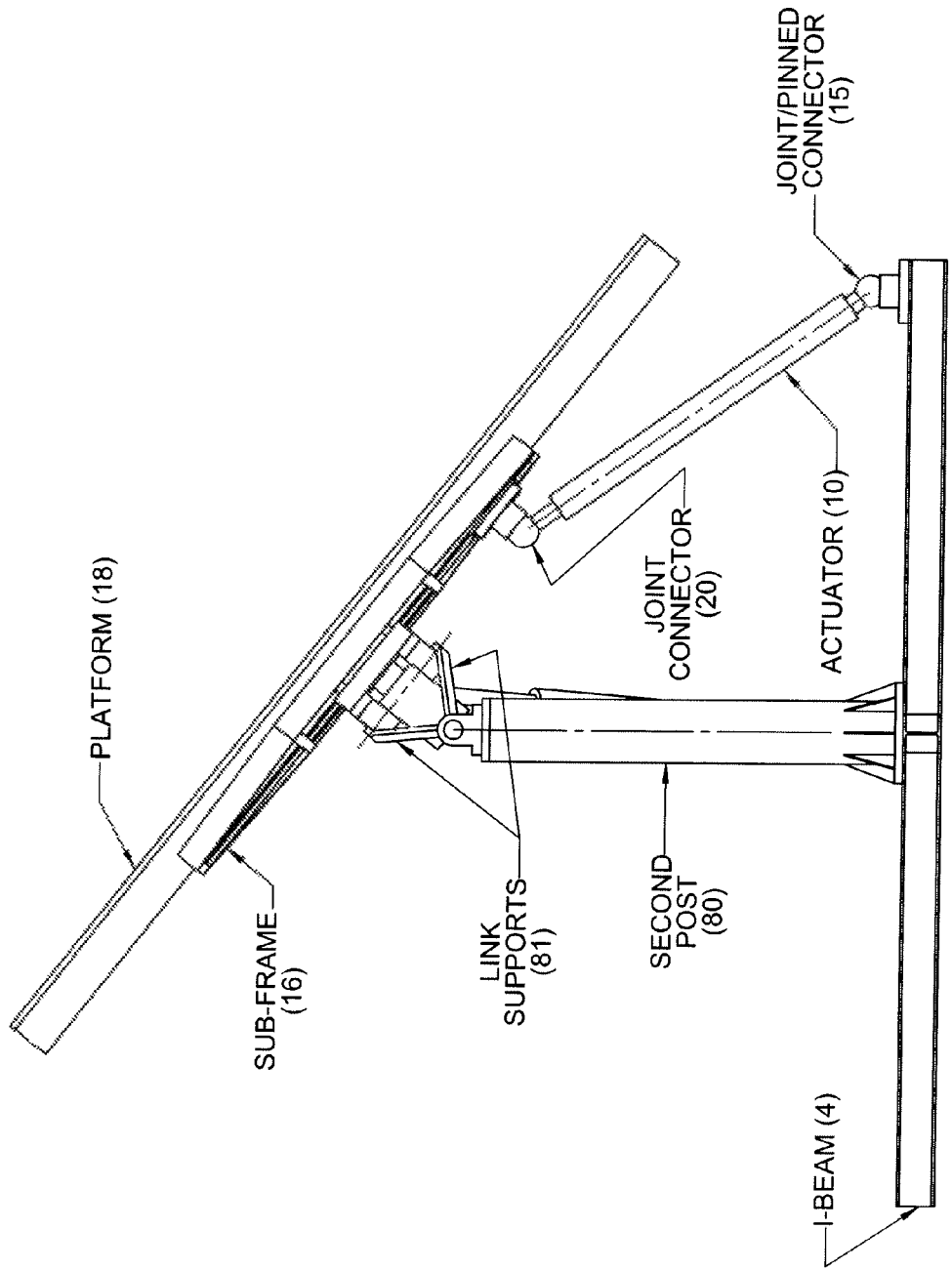
FIG. 15 is a side plan view of a feedforward controlled solar tracker with two posts, according to an embodiment of the present invention.

Further, as shown in FIGS. 13-15, in an embodiment of the present invention a second post 80 (fourth leg) is used to create greater stability and torque resistance. In this version the second post 80 is aligned with the axis of the lower rotation of the linking mechanism 22 and the axle of the lower joint 82 is extended to span the distance between the posts 14 and 80. The linking mechanism 22 is further supported by link supports 81.

Figure 19:
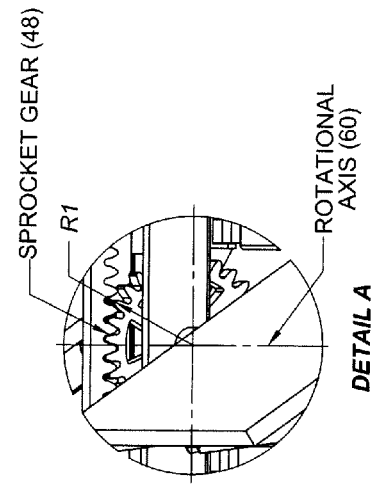
FIG. 19 is a front/side perspective view of a feedforward controlled solar tracker that utilizes a constant moment lever for actuation through a sprocket gear and a rack gear, according to an embodiment of the present invention.
Figure 20:
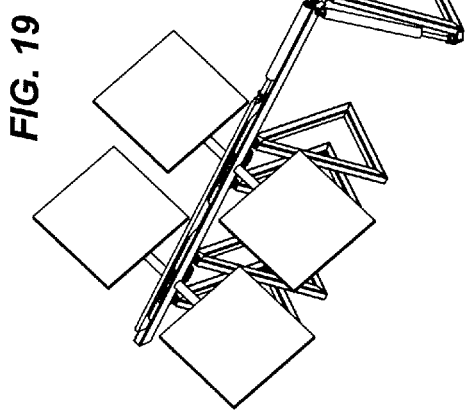
FIG. 20 is a side perspective view of a feedforward controlled solar tracker that utilizes a constant moment lever for actuation through a sprocket gear and a rack gear, according to an embodiment of the present invention.
Figure 20A:
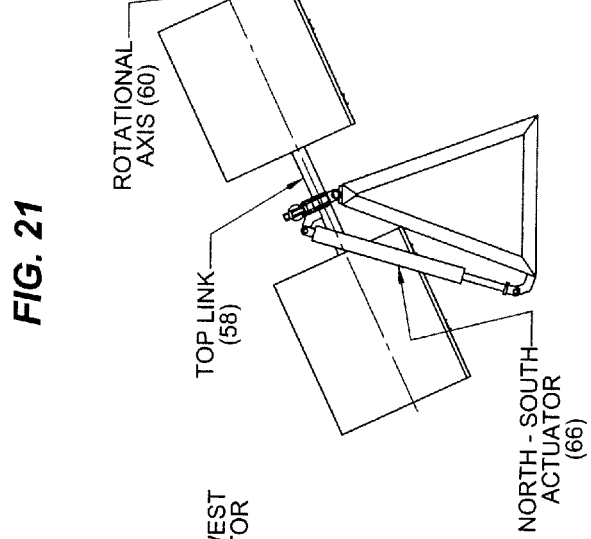
FIG. 20A is a detail of the sprocket gear of a feedforward controlled solar tracker that utilizes a constant moment lever for actuation, according to an embodiment of the present invention.
Figure 21:
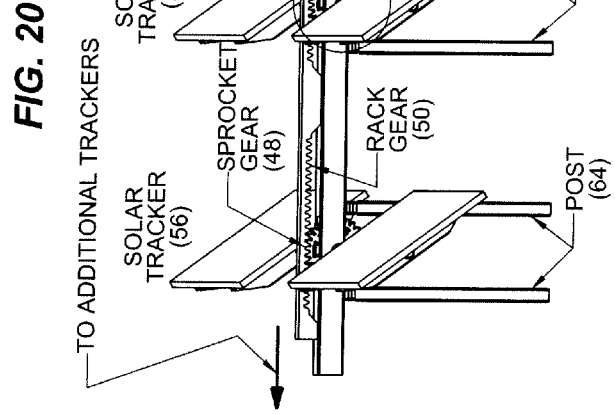
FIG. 21 is a front plan view of a feedforward controlled solar tracker that utilizes a constant moment lever for actuation through a sprocket gear and a rack gear, according to an embodiment of the present invention.

As depicted in FIGS. 19-21, another embodiment of the present invention provides a constant moment lever 46 for actuation through a sprocket gear 48 and rack gear 50. This configuration also allows multiple trackers to share a single actuator 52 for the east-west actuation. The single actuator 52 pushes and pulls a rod 54 with a rack gear 50 attached to the rod 54 at each solar tracker 56. The rack gear 50 interfaces with a sprocket gear 48 segment on each tracker 56. The post-top link 58 is directly connected to the sprocket gear 48 such that the link 58 rotates east and west (or along the orientation desired at setup) as the rod 54 is pushed and pulled. The rod 54 runs at or near ground level so as to provide clearance for the solar tracker motion. The sprocket gear 48 segment has a radius R1 from the center of the rotational axis 60 of the lower axle of the post-top link 58 down to the rack gear 50 on the rod 54. In certain embodiments, the post 64 can be split such that the rod 54 and sprocket gear 48 run between the two parts of the post 64 or the rod 54 and sprocket gear 48 may run adjacent to the post 64. The second actuator 66 for each solar tracker can be moved continuously or may be moved periodically as needed to meet performance requirements. In other embodiments the second actuator 66 is replaced with a fixed length member or a manually adjusted length member. This embodiment would be much less costly to build and would provide advanced performance over other solar trackers.

In yet another alternate embodiment the east-west actuator is positioned horizontally and moves a gear rack which turns a spur gear that is an integral part of the post link. The center of the spur gear is the bottom axle of the link. The top axle of the link is attached to the spur gear joining two points on the outer circumference of the gear such that the axle has a sufficiently long connection to the gear as to assure strength and stability, and is sufficiently far from the other axle as to provide adequate angular freedom to assure all positions of the sun can be reached by the tracker. The axles would preferably be orthogonal to one another. The two ends of the top axle and the second actuator on the sub-frame would form stability triangles. The horizontal actuator would be supported by a short post at its fixed end and it would be supported by the center post at the rod end. The short post, main post, and base of the second actuator would form the stability triangle on the ground. The main post could either be comprised of a two post system or a single post with a passage for the actuated gear rack and actuator support though its center.

As depicted in FIGS. 22, 22A and 22B, in another alternate embodiment a third ground-mounted actuator 68 is used to pull a chain or cable 70 across a sprocket or non-slip pulley 72 in opposition to the east-west control actuator 74 of a right angle with sprocket ("RAS") model tracker. This embodiment provides a constant moment for all positions of the actuators 74 driving the east-west angular position and provides a greater stability factor at and near the horizons. The chains or cable 70 can run over the top or under the bottom of the sprocket or non-slip pulley 72.

Although preferred embodiments of the present invention and modifications thereof have been described in detail herein, it is to be understood that this invention is not limited to the embodiments and modifications described herein, and that other modifications and variations may be effected by one skilled in the art without departing from the spirit and scope of the invention as defined by the appended claims. For example, the present invention may include four or more actuators, three or more posts, angled posts, as well as other features.

LIST OF REFERENCE NUMBERS INCLUDED IN FIGURES

The following is a list of reference numbers used in the attached figures for embodiments of the present invention.
(1) Foundation System
(2) Solar Tracking Apparatus
(4) I-Beam Cross
(6) Foundation Mountings
(8) Mounting Surface
(10) Actuator
(12) Actuator
(14) Post
(15) Joint/Pinned Connection
(16) Sub-frame
(17) Post Base
(18) Platform
(20) Joint Connection
(22) Linking Mechanism
(23) Linking Mechanism
(24) Right Angle Triangle
(25) Isosceles Triangle
(26) Center Axis
(27) Equilateral Triangle
(28) Bearing Assembly
(29) Steel Plate
(30) Bearing
(31) Body Member
(32) Offset
(33) First Axle
(34) Third Actuator
(35) Second Axle
(36) Mounts
(38) Braces
(40) Torsion Resistance Bars
(42) Foundations
(44) Pedestal
(46) Constant Moment Lever
(48) Sprocket Gear
(50) Rack Gear
(52) East-West Actuator
(54) Rod
(56) Solar Tracker
(58) Post Top Link
(60) Rotational Axis
(64) Post
(66) Second (North-South) Actuator
(68) Ground Mounted Actuator
(70) Chain
(72) Sprocket
(74) East-West Actuator
(76) Inverted Cylinder
(78) Rod Seals
(80) Second Post
(81) Link Supports
(82) Lower Joint
(84) Pull Bar
(86) Chain Connection
(88) Mounting Pins
(90) Torsion Bars
(92) Push Bar
(94) Guide Pins
(96) Foundation Plate

I claim:
1. An actuated feedforward controlled solar tracker system comprising:
a sub-frame for supporting at least one solar panel;
at least one post for supporting the sub-frame;
a linking member that connects the sub-frame to the post, wherein the linking member includes a first axle, a second axle and a body member disposed between the first axle and the second axle, wherein the first axle and the second axle are disposed substantially orthogonal to each other and separated by a distance approximately equal to the length of the body member;

at least two linear actuators, each actuator having a first end and a second end;

a rotational joint for connecting the second end of each of the linear actuators to the sub-frame;

a driver system for driving the linear actuators;

a feedforward control system including a computer that calculates desired positions of the linear actuators using multiple data points as inputs and communicates with the driver system to drive the linear actuators to the desired positions; and a feedback control system that relays information gathered by sensor devices to the feedforward control system, wherein the feedforward control system and the feedback control system function in an integrated manner.

2. The system according to claim 1, further comprising a rotational joint for connecting the first end of the linear actuators to a foundation system.

3. The system according to claim 1, further comprising at least one pedestal having a first end and a second end, the first end of the at least one pedestal being connected to a foundation system and the second end of the at least one pedestal being connected to a linear actuator with a rotational joint.

4. The system according to claim 1, wherein the first axle, the second axle and the body member are an integrated member or separate members.

5. The system according to claim 1, wherein the ends of the first axle and the second axle are disposed in bearing assemblies attached to the top of the post and to the bottom of the sub-frame.

6. The system according to claim 1, further comprising a foundation system including a plurality of beams and a plurality of securing members.

7. The system according to claim 5, further comprising bracing members having a first end and a second end, wherein the first end of each bracing member is connected to a beam and the second end of each bracing member is connected to the post.

8. The system according to claim 1, wherein the rotational joint and the linking member include two degree of freedom rotational movement.

9. The system according to claim 1, wherein the driver system includes a hydraulic system.

10. The system according to claim 8, wherein a reservoir for the hydraulic system is disposed in the post.

11. The system according to claim 9, wherein the linear actuators are hydraulic cylinders, the driver system is an electric motor connected to a hydraulic pump, and the feedforward control system communicates with the electric motor and a series of valves in the system to move the sub-frame to desired positions.

12. The system according to claim 1, further comprising torsion resistance bars having a first end and a second end, wherein the first end of each torsion resistance bar is connected to a base of the linear actuator and a second end of each torsion resistance bar is connected to a base of the post.

13. The system according to claim 1, further comprising means for preventing the sub-frame from being driven past its mechanical limits.

14. The system according to claim 1, wherein the data points are predetermined.

15. The system according to claim 1, wherein the data points are calculated in real-time.

16. The system according to claim 1, wherein the data points include time of day, date, geographical positioning system coordinates, foundation orientation, cylinder positions, the linking member's angles, valve positions and solar tracking sensor data.

17. The system according to claim 1, wherein the computer uses polynomial spline curves.

18. The system according to claim 16, wherein the polynomial spline curves include time differential characteristics.

19. The system according to claim 16, wherein the spline curves include second, third or higher degree polynomials.

20. An actuated feedforward controlled solar tracker system comprising:

a sub-frame for supporting at least one solar panel;

at least one post for supporting the sub-frame;

a linking member that connects the sub-frame to the post, wherein the linking member includes a first axle, a second axle and a body member disposed between the first axle and the second axle, wherein the first axle and the second axle are disposed substantially orthogonal to each other and separated by a distance approximately equal to the length of the body member, wherein the first axle, the second axle and the body member are an integrated member;

at least two linear actuators, each actuator having a first end and a second end;

a rotational joint for connecting the second end of the linear actuators to the sub-frame;

a driver system including a hydraulic system for driving the linear actuators;

at least one pedestal having a first end and a second end, the first end being connected to a foundation system and the second end being connected to a linear actuator with a rotational joint;

a feedforward control system including a computer that calculates desired positions of the linear actuators using multiple data points as inputs and communicates with the driver system to drive the linear actuators to the desired positions, wherein the data points include time of day, date, geographical positioning system coordinates, foundation orientation, cylinder positions, the linking member's angles, valve positions and solar tracking sensor data, wherein the computer uses polynomial spline curves; and a feedback control system that relays information gathered by sensor devices to the feedforward control system, wherein the feedforward control system and the feedback control system function in an integrated manner.

21. An actuated feedforward controlled solar tracker system comprising:

a sub-frame for supporting at least one solar panel;

at least one post for supporting the sub-frame;

a linking member that connects the sub-frame to the post, wherein the linking member includes a first axle, a second axle and a body member disposed between the first axle and the second axle, wherein the first axle and second axle are disposed substantially orthogonal to each other and separated by a distance approximately equal to the length of the body member, wherein the first axle, the second axle and the body member are an integrated member, wherein the ends of the first axle and the second axle are disposed in bearing assemblies attached to the top of the post and the bottom of the sub-frame;

at least two linear actuators, each actuator having a first end and a second end, and function as structural members;

a rotational joint for connecting the second end of the linear actuators to the sub-frame;

a driver system including a hydraulic system for driving the linear actuators;

at least one pedestal having a first end and a second end, the first end being connected to a beam of a foundation system and the second end being connected to a linear actuator with a rotational joint;

means for preventing the sub-frame from being driven past its mechanical limits;

a feedforward control system including a computer that calculates desired positions of the linear actuators using multiple data points as inputs and communicates with the driver system to drive the linear actuators to the desired positions, wherein the data points include time of day, time of year, date, geographical positioning system coordinates, onboard clock, foundation orientation, cylinder positions, the linking member's angles, valve positions and solar tracking sensor data, wherein the computer uses polynomial spline curves having time differential characteristics; and a feedback control system that relays information gathered by sensor devices to the feedforward control system, wherein the feedforward control system and the feedback control system function in an integrated manner.

* * * * *